United States Patent
Ioffe et al.

(10) Patent No.: US 10,980,035 B2
(45) Date of Patent: Apr. 13, 2021

(54) SUPPLEMENTAL USE OF MILLIMETER WAVE SPECTRUM

(71) Applicant: Apple Inc., Cupertino, CA (US)

(72) Inventors: Anatoliy S. Ioffe, Cupertino, CA (US); Ehsan Haghani, Redwood City, CA (US); Yakun Sun, San Jose, CA (US); Rohit U. Nabar, Sunnyvale, CA (US); Rodney A. Gomez Angulo, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/701,045

(22) Filed: Dec. 2, 2019

(65) Prior Publication Data
US 2020/0178261 A1 Jun. 4, 2020

Related U.S. Application Data

(60) Provisional application No. 62/774,540, filed on Dec. 3, 2018.

(51) Int. Cl.
*H04L 5/00* (2006.01)
*H04W 72/04* (2009.01)
(Continued)

(52) U.S. Cl.
CPC ......... *H04W 72/085* (2013.01); *H04L 1/1812* (2013.01); *H04W 24/10* (2013.01);
(Continued)

(58) Field of Classification Search
CPC ........... H04W 72/085; H04W 72/0413; H04W 24/10; H04W 72/0453; H04W 88/06; H04L 1/1812; H04L 5/001
See application file for complete search history.

(56) References Cited

U.S. PATENT DOCUMENTS 10,477,457 B2 11/2019 Park et al.
2010/0135238 A1* 6/2010 Sadri ................. H04W 72/0453
370/329
(Continued)

FOREIGN PATENT DOCUMENTS

WO 2019159096 A1 8/2019

OTHER PUBLICATIONS

"5G; NR; User Equipment (UE) radio transmission and reception; Part 1: Range 1 Standalone (3GPP TS 38.101-1 version 15.3.0 Release 15)" European Telecommunications Standards Institute (ETSI), Oct. 18, 2018.

*Primary Examiner* — Joseph E Dean, Jr.
(74) *Attorney, Agent, or Firm* — Treyz Law Group, P.C.; Michael H. Lyons

(57) ABSTRACT

An electronic device may be provided with wireless circuitry and control circuitry. The wireless circuitry may communicate using a 5G New Radio (NR) protocol. The wireless circuitry may have multiple bandwidth part configurations. The control circuitry may place the wireless circuitry in a first bandwidth part configuration where a first bandwidth part of a first component carrier is active and a second bandwidth part of a second component carrier is inactive. The control circuitry may switch the wireless circuitry from the first bandwidth part configuration to a second bandwidth part configuration in which the first bandwidth part is inactive and the second bandwidth part is active. The first and second component carriers may be intra-band contiguous, intra-band non-contiguous, or inter-band. The control circuitry may switch the wireless circuitry into other configurations for covering other bandwidth parts of any desired component carriers in any desired bands.

20 Claims, 20 Drawing Sheets

(51) Int. Cl.
*H04W 72/08* (2009.01)
*H04L 1/18* (2006.01)
*H04W 24/10* (2009.01)
*H04W 88/06* (2009.01)

(52) U.S. Cl.
CPC .... *H04W 72/0413* (2013.01); *H04W 72/0453* (2013.01); *H04W 88/06* (2013.01)

(56) References Cited

U.S. PATENT DOCUMENTS

| | | | |
|---|---|---|---|
| 2013/0197850 A1* | 8/2013 | Yu | G01R 31/2822 702/117 |
| 2015/0018002 A1* | 1/2015 | Touag | H04W 72/0426 455/454 |
| 2017/0265205 A1* | 9/2017 | HomChaudhuri | H04B 7/0413 |
| 2017/0347270 A1* | 11/2017 | Iouchi | H04L 5/0098 |
| 2018/0014251 A1* | 1/2018 | Sambhwani | H04W 52/0229 |
| 2018/0301814 A1* | 10/2018 | Zhang | H01Q 15/14 |
| 2019/0036673 A1* | 1/2019 | Chen | H04L 5/001 |
| 2019/0103954 A1* | 4/2019 | Lee | H04W 72/042 |
| 2019/0182000 A1 | 6/2019 | Futaki | |
| 2019/0182870 A1 | 6/2019 | Shih et al. | |
| 2019/0281598 A1 | 9/2019 | Almalfouh et al. | |
| 2019/0297620 A1* | 9/2019 | Tian | H04W 72/0446 |
| 2019/0313460 A1 | 10/2019 | Tsai | |
| 2019/0349060 A1* | 11/2019 | Liao | H04L 5/005 |
| 2019/0357292 A1 | 11/2019 | Cirik et al. | |
| 2019/0363843 A1 | 11/2019 | Gordaychik | |
| 2019/0364602 A1 | 11/2019 | Yi et al. | |
| 2019/0373663 A1 | 12/2019 | Yu et al. | |
| 2019/0373667 A1 | 12/2019 | Jeon et al. | |

\* cited by examiner

SUPPLEMENTAL USE OF MILLIMETER WAVE SPECTRUM

This application claims the benefit of provisional patent application No. 62/774,540, filed Dec. 3, 2018, which is hereby incorporated by reference herein in its entirety.

FIELD

This relates generally to electronic devices and, more particularly, to electronic devices with wireless communications circuitry.

BACKGROUND

Electronic devices often include wireless communications circuitry. For example, cellular telephones, computers, and other devices often contain antennas and wireless transceivers for supporting wireless communications.

It may be desirable to support wireless communications in millimeter wave and centimeter wave communications bands. Millimeter wave communications, which are sometimes referred to as extremely high frequency (EHF) communications, and centimeter wave communications involve communications at frequencies of about 10-300 GHz. Operation at these frequencies may support high bandwidths but may raise significant challenges. For example, the allocation of millimeter wave spectrum globally faces significant challenges in terms of region-specific and nation-specific regulatory requirements. In addition, it can be difficult to allocate millimeter wave spectrum in a manner that can be efficiently and flexibly supported by the wireless communications circuitry.

SUMMARY

An electronic device may be provided with wireless circuitry and control circuitry. The wireless circuitry may communicate with a wireless base station using a 5G New Radio (NR) communications protocol. The wireless circuitry and the base station may convey radio-frequency signals using component carriers in the Frequency Range 1 (FR1) frequency range and/or the Frequency Range 2 (FR2) frequency range of the 5G NR communications protocol.

The wireless circuitry may have multiple bandwidth part configurations. The control circuitry may place the wireless circuitry in a first bandwidth part configuration. In the first bandwidth part configuration, a first bandwidth part of a first component carrier may be active and a second bandwidth part of a second component carrier that is different from the first component carrier may be inactive. The wireless circuitry may transmit first uplink signals using the first bandwidth part of the first component carrier while in the first bandwidth part configuration. The control circuitry may switch the wireless circuitry from the first bandwidth part configuration to a second bandwidth part configuration. In the second bandwidth part configuration, the first bandwidth part of the first component carrier may be inactive and the second bandwidth part of the second component carrier may be active. The wireless circuitry may transmit second uplink signals using the second bandwidth part of the second component carrier while in the second bandwidth part configuration. The first and second component carriers may be intra-band contiguous component carriers, intra-band non-contiguous component carriers, or inter-band component carriers. The control circuitry may switch the wireless circuitry into other bandwidth part configurations for covering other bandwidth parts of any desired component carriers in any desired bands. The uplink signals may include uplink control channel information if desired.

In one suitable arrangement, in the first bandwidth part configuration, a first bandwidth part of a first component carrier may be active, a second bandwidth part of a second component carrier may be active, and a third bandwidth part of a third component carrier may be inactive. In the second bandwidth part configuration, the first bandwidth part of the first component carrier may be inactive, the second bandwidth part of the second component carrier may be inactive, and the third bandwidth part of the third component carrier may be active. The third component carrier may be intra-band and non-contiguous with respect to the first and second component carriers or may be in a different communications band than the first and second component carriers.

In another suitable arrangement, the wireless circuitry may receive first downlink signals using a first component carrier in the FR2 frequency range of the 5G NR communications protocol. During a configurable monitoring period having an adjustable duration that is set by the base station, the control circuitry may generate uplink control channel information based on the first downlink signals received using the first component carrier. During the configurable monitoring period, the wireless circuitry may transmit the uplink control channel information using a second component carrier in the FR1 frequency range of the 5G NR communications protocol. After the configurable monitoring period has elapsed, the wireless circuitry may receive second downlink signals using the first component carrier and additional uplink control channel information may be generated.

DETAILED DESCRIPTION

Figure 1:
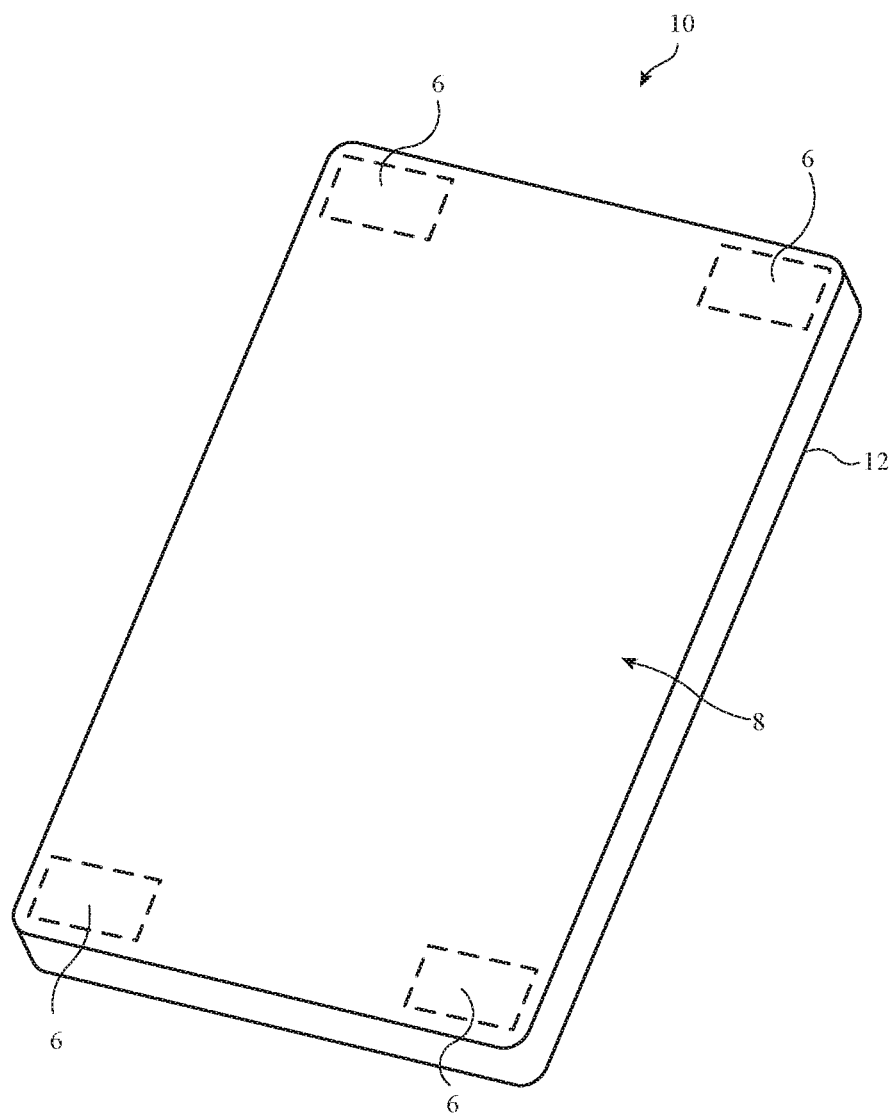
FIG. 1 is a front perspective view of an illustrative electronic device with wireless circuitry in accordance with some embodiments.

An electronic device such as electronic device 10 of FIG. 1 may contain wireless circuitry. The wireless circuitry may include one or more antennas. The antennas may include phased antenna arrays and other antennas (e.g., antennas that do not form part of a phased antenna array) that transmit radio-frequency signals to external equipment such as a wireless base station and that receive radio-frequency signals from the wireless base station. The radio-frequency signals may be conveyed using 5G New Radio (5G NR) communications bands or any other desired communications bands. The radio-frequency signals may include millimeter wave signals, sometimes referred to as extremely high frequency (EHF) signals, which propagate at frequencies above about 30 GHz (e.g., at 60 GHz or other frequencies between about 30 GHz and 300 GHz). The radio-frequency signals may also include centimeter wave signals, which propagate at frequencies between about 10 GHz and 30 GHz. The radio-frequency signals may also include signals at frequencies less than 10 GHz, such as signals between about 410 MHz and 7125 MHz. In scenarios where the radio-frequency signals are conveyed using 5G NR communications bands, the radio-frequency signals may be conveyed in 5G NR communications bands within 5G NR Frequency Range 2 (FR2), which includes centimeter and millimeter wave frequencies between about 24 GHz and 100 GHz, and/or 5G NR communications bands within 5G NR Frequency Range 1 (FR1), which includes frequencies below 7125 MHz. If desired, device 10 may also contain antennas for handling satellite navigation system signals, cellular telephone signals (e.g., radio-frequency signals conveyed using long term evolution (LTE) communications bands or other non-5G NR communications bands), wireless local area network signals, near-field communications, light-based wireless communications, or other wireless communications.

Electronic device 10 (sometimes referred to herein as user equipment 10) may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a virtual or augmented reality headset device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless access point or base station, a desktop computer, a portable speaker, a keyboard, a gaming controller, a gaming system, a computer mouse, a mousepad, a trackpad or touchpad, equipment that implements the functionality of two or more of these devices, or other electronic equipment. In the illustrative configuration of FIG. 1, device 10 is a portable device such as a cellular telephone, media player, tablet computer, portable speaker, or other portable computing device. Other configurations may be used for device 10 if desired. The example of FIG. 1 is merely illustrative.

As shown in FIG. 1, device 10 may include a display such as display 8. Display 8 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 8 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch sensor electrodes may be formed from an array of indium tin oxide pads or other transparent conductive structures.

Display 8 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 8 may be protected using a display cover layer such as a layer of transparent glass, clear plastic, sapphire, or other transparent dielectrics. Openings may be formed in the display cover layer. For example, openings may be formed in the display cover layer to accommodate one or more buttons, sensor circuitry such as a fingerprint sensor or light sensor, ports such as a speaker port or microphone port, etc. Openings may be formed in housing 12 to form communications ports (e.g., an audio jack port, a digital data port, charging port, etc.). Openings in housing 12 may also be formed for audio components such as a speaker and/or a microphone.

Antennas may be mounted in housing 12. If desired, some of the antennas (e.g., antenna arrays that implement beam steering, etc.) may be mounted under an inactive border region of display 8 (see, e.g., illustrative antenna locations 6 of FIG. 1). Display 8 may contain an active area with an array of pixels (e.g., a central rectangular portion). Inactive areas of display 8 are free of pixels and may form borders for the active area. If desired, antennas may also operate through dielectric-filled openings in the rear of housing 12 or elsewhere in device 10.

To avoid disrupting communications when an external object such as a human hand or other body part of a user blocks one or more antennas, antennas may be mounted at multiple locations in housing 12. Sensor data such as proximity sensor data, real-time antenna impedance measurements, signal quality measurements such as received signal strength information, and other data may be used in determining when one or more antennas is being adversely affected due to the orientation of housing 12, blockage by a user's hand or other external object, or other environmental factors. Device 10 can then switch one or more replacement antennas into use in place of the antennas that are being adversely affected.

Antennas may be mounted at the corners of housing 12 (e.g., in corner locations 6 of FIG. 1 and/or in corner locations on the rear of housing 12), along the peripheral edges of housing 12, on the rear of housing 12, under the display cover glass or other dielectric display cover layer that is used in covering and protecting display 8 on the front of device 10, over a dielectric window on a rear face of housing 12 or the edge of housing 12, over a dielectric cover layer such as a dielectric rear housing wall that covers some or all of the rear face of device 10, or elsewhere in device 10.

Figure 2:
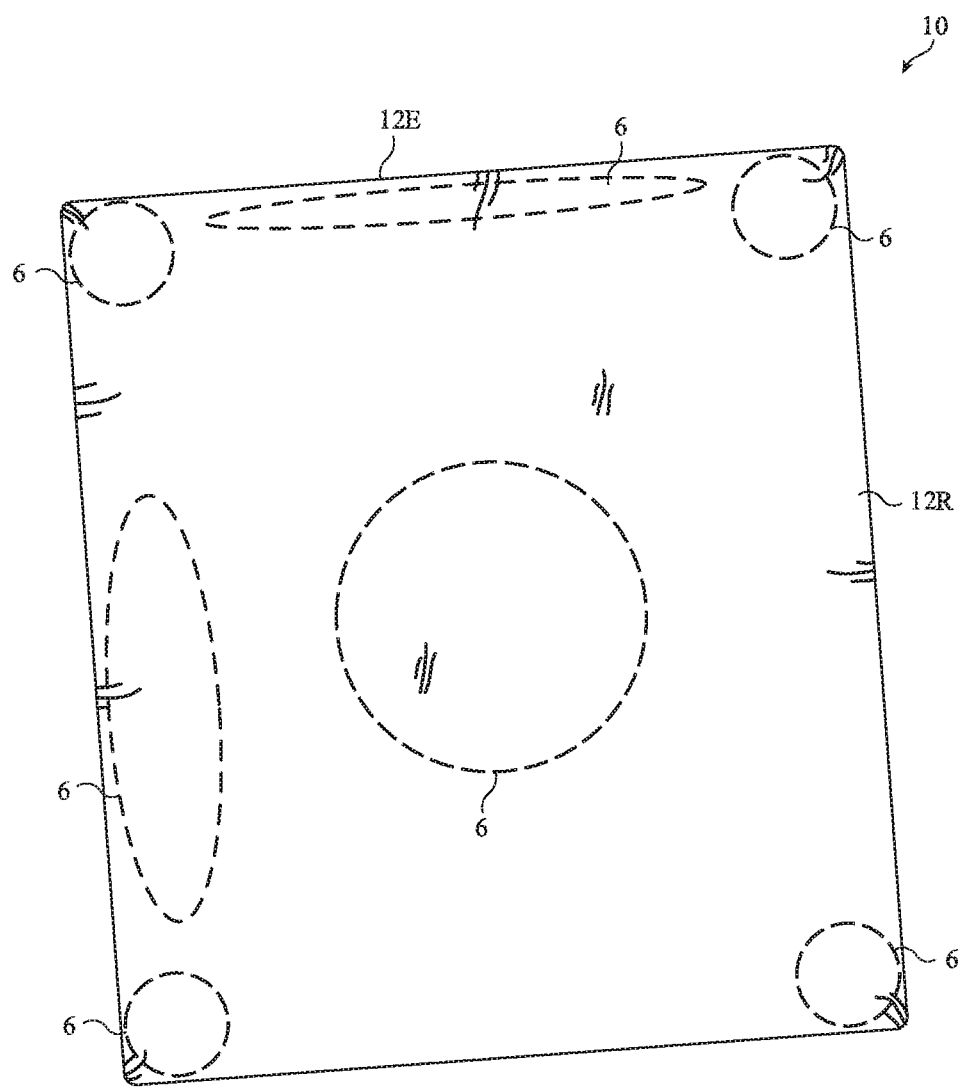
FIG. 2 is a rear perspective view of an illustrative electronic device with wireless circuitry in accordance with some embodiments.

FIG. 2 is a rear perspective view of electronic device 10 showing illustrative locations 6 on the rear and sides of housing 12 in which antennas (e.g., single antennas and/or phased antenna arrays) may be mounted in device 10. The antennas may be mounted at the corners of device 10, along the edges of housing 12 such as edges formed by sidewalls 12E, on upper and lower portions of rear housing wall 12R, in the center of rear housing wall 12R (e.g., under a dielectric window structure or other antenna window in the center of rear housing wall 12R), at the corners of rear housing wall 12R (e.g., on the upper left corner, upper right corner, lower left corner, and lower right corner of the rear of housing 12 and device 10), etc.

In configurations in which housing 12 is formed entirely or nearly entirely from a dielectric (e.g., plastic, glass, sapphire, ceramic, fabric, etc.), the antennas may transmit and receive antenna signals through any suitable portion of the dielectric. In configurations in which housing 12 is formed from a conductive material such as metal, regions of the housing such as slots or other openings in the metal may be filled with plastic or other dielectrics. The antennas may be mounted in alignment with the dielectric in the openings. These openings, which may sometimes be referred to as dielectric antenna windows, dielectric gaps, dielectric-filled openings, dielectric-filled slots, elongated dielectric opening regions, etc., may allow antenna signals to be transmitted to external wireless equipment from the antennas mounted within the interior of device 10 and may allow internal antennas to receive antenna signals from external wireless equipment. In another suitable arrangement, the antennas may be mounted on the exterior of conductive portions of housing 12.

FIGS. 1 and 2 are merely illustrative. In general, housing 12 may have any desired shape (e.g., a rectangular shape, a cylindrical shape, a spherical shape, combinations of these, etc.). Display 8 of FIG. 1 may be omitted if desired. Antennas may be located within housing 12, on housing 12, and/or external to housing 12.

Figure 3:
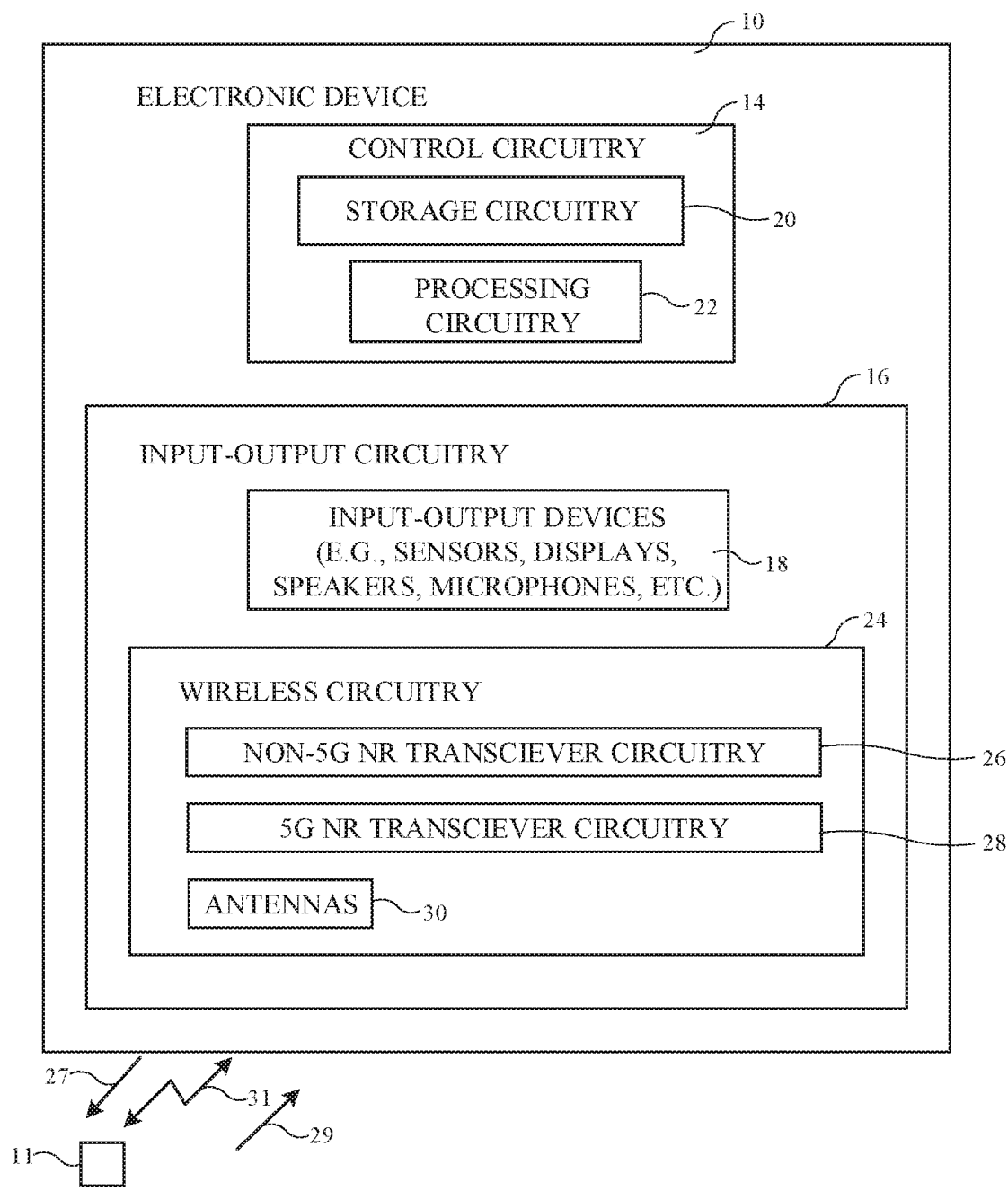
FIG. 3 is a schematic diagram of an illustrative electronic device with wireless circuitry for communicating with a wireless base station in accordance with some embodiments.

A schematic diagram of illustrative components that may be used in device 10 is shown in FIG. 3. As shown in FIG. 3, device 10 may include control circuitry 14. Control circuitry 14 may include storage such as storage circuitry 20. Storage circuitry 20 may include hard disk drive storage, nonvolatile memory (e.g., flash memory or other electrically-programmable-read-only memory configured to form a solid-state drive), volatile memory (e.g., static or dynamic random-access-memory), etc. Control circuitry 14 may include processing circuitry such as processing circuitry 22. Processing circuitry 22 may be used to control the operation of device 10. Processing circuitry 22 may include on one or more microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 20 (e.g., storage circuitry 20 may include non-transitory (tangible) computer readable storage media that stores the software code). The software code may sometimes be referred to as program instructions, software, data, instructions, or code. Software code stored on storage circuitry 20 may be executed by processing circuitry 22.

Control circuitry 14 may be used to run software on device 10 such as internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11 ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol. In one suitable arrangement that is sometimes described herein as an example, control circuitry 14 is used in implementing a $3^{rd}$ Generation Partnership Project (3GPP) and $5^{th}$ generation wireless systems (5G) communications protocol such as a 5G NR communications protocol. Wireless circuitry 24 in device 10 may also be implemented using a 5G NR RAT and control circuitry 14 may control wireless circuitry 24 based on the 5G NR RAT.

Device 10 may include input-output circuitry 16. Input-output circuitry 16 may include input-output devices 18. Input-output devices 18 may be used to allow data to be supplied to device 10 and to allow data to be provided from device 10 to external devices. Input-output devices 18 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 16 may include wireless circuitry such as wireless circuitry 24 for wirelessly conveying radio-frequency signals. While control circuitry 14 is shown separately from wireless circuitry 24 in the example of FIG. 3 for the sake of clarity, wireless circuitry 24 may include processing circuitry that forms a part of processing circuitry 22 and/or storage circuitry that forms a part of storage circuitry 20 of control circuitry 14 (e.g., portions of control circuitry 14 may be implemented on wireless circuitry 24). As an example, control circuitry 14 may include baseband processor circuitry or other control components that form a part of wireless circuitry 24.

Wireless circuitry 24 may include radio-frequency transceiver circuitry that is used in conveying radio-frequency signals using the 5G NR communications protocol and RAT such as 5G NR transceiver circuitry 28. 5G NR transceiver circuitry 28 may support communications at frequencies between about 24 GHz and 100 GHz (e.g., within FR2) and/or at frequencies between about 410 MHz and 7125 MHz (e.g., within FR1). Examples of frequency bands that may be covered by 5G NR transceiver circuitry 28 include an IEEE K communications band between about 18 GHz and 27 GHz, a $K_a$ communications band between about 26.5 GHz and 40 GHz, a $K_u$ communications band between about 12 GHz and 18 GHz, a V communications band between about 40 GHz and 75 GHz, a W communications band between about 75 GHz and 110 GHz, and/or other frequency bands between approximately 10 GHz and 110 GHz, a C-band between about 3300 MHz and 5000 MHz, an S-band between about 2300 MHz and 2400 MHz, an L-band between about 1432 MHz and 1517 MHz, and/or other frequency bands between approximately 410 MHz and 7125 MHz. 5G NR transceiver circuitry 28 may be formed from one or more integrated circuits (e.g., multiple integrated circuits mounted on a common printed circuit in a system-in-package device, one or more integrated circuits mounted on different substrates, etc.).

Wireless communications using 5G NR transceiver circuitry 28 may be bidirectional. For example, 5G NR transceiver circuitry 28 may convey radio-frequency signals 31 to and from external wireless equipment such as external equipment 11. External equipment 11 may be another electronic device such as electronic device 10, may be a wireless access point, may be a wireless base station, etc. Arrangements in which external equipment 11 is a wireless base station are sometimes described herein as an example. External equipment 11 may therefore sometimes be referred to herein as base station 11.

Radio-frequency signals 31 (sometimes referred to herein as wireless link 31) may include radio-frequency signals transmitted by device 10 to base station 11 (e.g., in uplink direction 27) and radio-frequency signals transmitted by base station 11 to device 10 (e.g., in downlink direction 29). The radio-frequency signals 31 conveyed in uplink direction 27 may sometimes be referred to herein as uplink signals. The radio-frequency signals in downlink direction 29 may sometimes be referred to herein as downlink signals. Radio-frequency signals 31 may be used to convey wireless data. The wireless data may include a stream of data arranged into data packets, symbols, frames, etc. The wireless data may be organized/formatted according to the communications protocol governing the wireless link between device 10 and base station 11 (e.g., a 5G NR communications protocol). Wireless data conveyed by the uplink signals transmitted by device 10 (e.g., in uplink direction 27) may sometimes be referred to herein as uplink data. Wireless data conveyed by the downlink signals transmitted by base station 11 in (e.g., in downlink direction 29) may sometimes be referred to herein as downlink data. The wireless data may, for example, include data that has been encoded into corresponding data packets such as wireless data associated with a telephone call, streaming media content, internet browsing, wireless data associated with software applications running on device 10, email messages, etc.

If desired, wireless circuitry 24 may also include transceiver circuitry for handling communications in non-5G NR communications bands such as non-5G NR transceiver circuitry 26. Non-5G NR transceiver circuitry 26 may include wireless local area network (WLAN) transceiver circuitry that handles 2.4 GHz and 5 GHz bands for Wi-Fi® (IEEE 802.11) communications, wireless personal area network (WPAN) transceiver circuitry that handles the 2.4 GHz Bluetooth® communications band, cellular telephone transceiver circuitry that handles cellular telephone communications bands from 700 to 960 MHz, 1710 to 2170 MHz, 2300 to 2700 MHz, and/or or any other desired cellular telephone communications bands between 600 MHz and 4000 MHz (e.g., cellular telephone signals conveyed using a 4G LTE protocol, a 3G protocol, or other non-5G NR protocols), GPS receiver circuitry that receives GPS signals at 1575 MHz or signals for handling other satellite positioning data (e.g., GLONASS signals at 1609 MHz), television receiver circuitry, AM/FM radio receiver circuitry, paging system transceiver circuitry, near field communications (NFC) circuitry, etc. Non-5G NR transceiver circuitry 26 and 5G NR transceiver circuitry 28 may each include one or more integrated circuits, power amplifier circuitry, low-noise input amplifiers, passive radio-frequency components, switching circuitry, transmission line structures, and other circuitry for handling radio-frequency signals.

Wireless circuitry 24 may include antennas 30. Non-5G NR transceiver circuitry 26 may transmit and receive radio-frequency signals below 10 GHz (and organized according to a non-5G NR communications protocol) using one or more antennas 30. 5G NR transceiver circuitry 28 may transmit and receive radio-frequency signals (e.g., at FR1 and/or FR2 frequencies including frequencies above 10 GHz) using antennas 30.

In satellite navigation system links, cellular telephone links, and other long-range links, radio-frequency signals are typically used to convey data over thousands of feet or miles. In Wi-Fi® and Bluetooth® links at 2.4 and 5 GHz and other short-range wireless links, radio-frequency signals are typically used to convey data over tens or hundreds of feet. 5G NR transceiver circuitry 28 may convey radio-frequency signals over short distances that travel over a line-of-sight path. To enhance signal reception for 5G NR communications, and particularly for communications at frequencies greater than 10 GHz, phased antenna arrays and beam forming (steering) techniques may be used (e.g., schemes in which antenna signal phase and/or magnitude for each antenna in an array are adjusted to perform beam steering). Antenna diversity schemes may also be used to ensure that the antennas that have become blocked or that are otherwise degraded due to the operating environment of device 10 can be switched out of use and higher-performing antennas used in their place.

Antennas 30 in wireless circuitry 24 may be formed using any suitable antenna types. For example, antennas 30 may include antennas with resonating elements that are formed from stacked patch antenna structures, loop antenna structures, patch antenna structures, inverted-F antenna structures, slot antenna structures, planar inverted-F antenna structures, monopole antenna structures, dipole antenna structures, helical antenna structures, Yagi (Yagi-Uda) antenna structures, hybrids of these designs, etc. If desired, one or more of antennas 30 may be cavity-backed antennas. Different types of antennas may be used for different bands and combinations of bands. For example, one type of antenna may be used in forming non-5G NR wireless links for non-5G NR transceiver circuitry 26 and another type of antenna may be used in conveying radio-frequency signals in 5G NR communications bands for 5G NR transceiver circuitry 28. If desired, antennas 30 that are used to convey radio-frequency signals for 5G NR transceiver circuitry 28 may be arranged in one or more phased antenna arrays.

Figure 4:
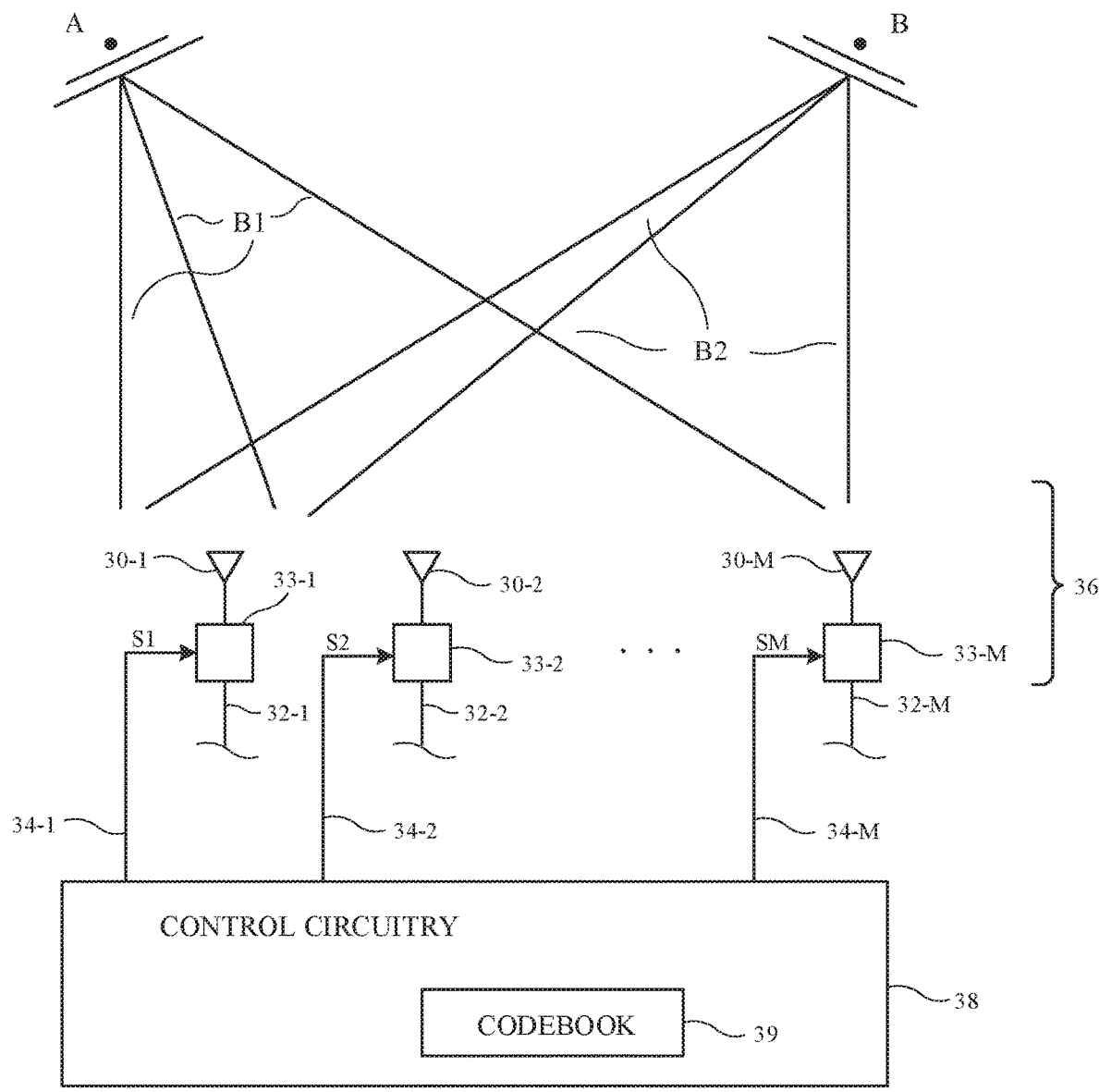
FIG. 4 is a diagram of an illustrative phased antenna array that forms a radio-frequency signal beam at different beam pointing angles in accordance with some embodiments.

FIG. 4 is a diagram showing how antennas 30 for handling radio-frequency signals in 5G NR communications bands (e.g., at frequencies greater than 10 GHz) may be formed in a phased antenna array. As shown in FIG. 4, phased antenna array 36 (sometimes referred to herein as array 36, antenna array 36, or array 36 of antennas 30) may be coupled to radio-frequency transmission line paths 32. For example, a first antenna 30-1 in phased antenna array 36 may be coupled to a first radio-frequency transmission line path 32-1, a second antenna 30-2 in phased antenna array 36 may be coupled to a second radio-frequency transmission line path 32-2, an Mth antenna 30-M in phased antenna array 36 may be coupled to an Mth radio-frequency transmission line path 32-M, etc. While antennas 30 are described herein as forming a phased antenna array, the antennas 30 in phased antenna array 36 may sometimes also be referred to as collectively forming a single phased array antenna (e.g., where each antenna 30 in the phased array antenna forms an antenna element of the phased array antenna).

Radio-frequency transmission line paths 32 may each be coupled to 5G NR transceiver circuitry 28 of FIG. 3. Each radio-frequency transmission line path 32 may include one or more radio-frequency transmission lines, a positive signal conductor, and a ground signal conductor. The positive signal conductor may be coupled to a positive antenna feed terminal on an antenna resonating element of the corresponding antenna 30. The ground signal conductor may be coupled to a ground antenna feed terminal on an antenna ground for the corresponding antenna 30.

Radio-frequency transmission line paths 32 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, conductive vias, combinations of these, etc. Multiple types of transmission lines may be used to couple the millimeter/centimeter wave transceiver circuitry to phased antenna array 36. Filter circuitry, switching circuitry, impedance matching circuitry, phase shifter circuitry, amplifier circuitry, and/or other circuitry may be interposed on radio-frequency transmission line path 32, if desired.

Radio-frequency transmission lines in device 10 may be integrated into ceramic substrates, rigid printed circuit boards, and/or flexible printed circuits. In one suitable arrangement, radio-frequency transmission lines in device 10 may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

Antennas 30 in phased antenna array 36 may be arranged in any desired number of rows and columns or in any other desired pattern (e.g., the antennas need not be arranged in a grid pattern having rows and columns). During signal transmission operations, radio-frequency transmission line paths 32 may be used to supply signals (e.g., radio-frequency signals such as millimeter wave and/or centimeter wave signals) from 5G NR transceiver circuitry 28 (FIG. 3) to phased antenna array 36 for wireless transmission. During signal reception operations, radio-frequency transmission line paths 32 may be used to convey signals received at phased antenna array 36 (e.g., from base station 11 of FIG. 3) to 5G NR transceiver circuitry 28 (FIG. 3).

The use of multiple antennas 30 in phased antenna array 36 allows radio-frequency beam forming arrangements (sometimes referred to herein as radio-frequency beam steering arrangements) to be implemented by controlling the relative phases and magnitudes (amplitudes) of the radio-frequency signals conveyed by the antennas. In the example of FIG. 4, the antennas 30 in phased antenna array 36 each have a corresponding radio-frequency phase and magnitude controller 33 (e.g., a first phase and magnitude controller 33-1 interposed on radio-frequency transmission line path 32-1 may control phase and magnitude for radio-frequency signals handled by antenna 30-1, a second phase and magnitude controller 33-2 interposed on radio-frequency transmission line path 32-2 may control phase and magnitude for radio-frequency signals handled by antenna 30-2, an Mth phase and magnitude controller 33-M interposed on radio-frequency transmission line path 32-M may control phase and magnitude for radio-frequency signals handled by antenna 30-M, etc.).

Phase and magnitude controllers 33 may each include circuitry for adjusting the phase of the radio-frequency signals on radio-frequency transmission line paths 32 (e.g., phase shifter circuits) and/or circuitry for adjusting the magnitude of the radio-frequency signals on radio-frequency transmission line paths 32 (e.g., power amplifier and/or low noise amplifier circuits). Phase and magnitude controllers 33 may sometimes be referred to collectively herein as beam steering or beam forming circuitry (e.g., beam steering circuitry that steers the beam of radio-frequency signals transmitted and/or received by phased antenna array 36).

Phase and magnitude controllers 33 may adjust the relative phases and/or magnitudes of the transmitted signals that are provided to each of the antennas in phased antenna array 36 and may adjust the relative phases and/or magnitudes of the received signals that are received by phased antenna array 36. Phase and magnitude controllers 33 may, if desired, include phase detection circuitry for detecting the phases of the received signals that are received by phased antenna array 36. The term "beam," "signal beam," "radio-frequency beam," or "radio-frequency signal beam" may be used herein to collectively refer to wireless signals that are transmitted and received by phased antenna array 36 in a particular direction. The signal beam may exhibit a peak gain that is oriented in a particular beam pointing direction at a corresponding beam pointing angle (e.g., based on constructive and destructive interference from the combination of signals from each antenna in the phased antenna array). The term "transmit beam" may sometimes be used herein to refer to radio-frequency signals that are transmitted in a particular direction whereas the term "receive beam" may sometimes be used herein to refer to radio-frequency signals that are received from a particular direction.

If, for example, phase and magnitude controllers 33 are adjusted to produce a first set of phases and/or magnitudes for transmitted radio-frequency signals, the transmitted signals will form a transmit beam as shown by beam B1 of FIG. 4 that is oriented in the direction of point A. If, however, phase and magnitude controllers 33 are adjusted to produce a second set of phases and/or magnitudes for the transmitted signals, the transmitted signals will form a transmit beam as shown by beam B2 that is oriented in the direction of point B. Similarly, if phase and magnitude controllers 33 are adjusted to produce the first set of phases and/or magnitudes, radio-frequency signals (e.g., radio-frequency signals in a receive beam) may be received from the direction of point A, as shown by beam B1. If phase and magnitude controllers 33 are adjusted to produce the second set of phases and/or magnitudes, radio-frequency signals may be received from the direction of point B, as shown by beam B2.

Each phase and magnitude controller 33 may be controlled to produce a desired phase and/or magnitude based on a corresponding control signal S received from control circuitry 38 of FIG. 4 over control paths 34 (e.g., the phase and/or magnitude provided by phase and magnitude controller 33-1 may be controlled using control signal S1 on control path 34-1, the phase and/or magnitude provided by phase and magnitude controller 33-2 may be controlled using control signal S2 on control path 34-2, the phase and/or magnitude provided by phase and magnitude controller 33-M may be controlled using control signal SM on control path 34-M, etc.). If desired, control circuitry 38 may actively adjust control signals S in real time to steer the transmit or receive beam in different desired directions (e.g., to different desired beam pointing angles) over time. Phase and magnitude controllers 33 may provide information identifying the phase of received signals to control circuitry 38 if desired.

When performing wireless communications using radio-frequency signals at millimeter and centimeter wave frequencies, the radio-frequency signals are conveyed over a line of sight path between phased antenna array 36 and external wireless equipment (e.g., base station 11 of FIG. 3). If the external wireless equipment is located at point A of FIG. 4, phase and magnitude controllers 33 may be adjusted to steer the signal beam towards point A (e.g., to form a signal beam having a beam pointing angle directed towards point A). Phased antenna array 36 may then transmit and receive radio-frequency signals in the direction of point A. Similarly, if the external wireless equipment is located at point B, phase and magnitude controllers 33 may be adjusted to steer the signal beam towards point B (e.g., to form a signal beam having a beam pointing angle directed towards point B). Phased antenna array 36 may then transmit and receive radio-frequency signals in the direction of point B. In the example of FIG. 4, beam steering is shown as being performed over a single degree of freedom for the sake of simplicity (e.g., towards the left and right on the page of FIG. 4). However, in practice, the beam may be steered over two or more degrees of freedom (e.g., in three dimensions, into and out of the page and to the left and right on the page of FIG. 4). Phased antenna array 36 may have a corresponding field of view over which beam steering can be performed (e.g., in a hemisphere or a segment of a hemisphere over the phased antenna array). If desired, device 10 may include multiple phased antenna arrays that each face a different direction to provide coverage from multiple sides of the device.

Control circuitry 38 of FIG. 4 may form a part of control circuitry 14 of FIG. 3 or may be separate from control circuitry 14 of FIG. 3. Control circuitry 38 of FIG. 4 may identify a desired beam pointing angle for the signal beam of phased antenna array 36 and may adjust the control signals S provided to phased antenna array 36 to configure phased antenna array 36 to form (steer) the signal beam at that beam pointing angle. Each possible beam pointing angle that can be used by phased antenna array 36 during wireless communications may be identified by a beam steering codebook such as codebook 39. Codebook 39 may be stored at control circuitry 38, elsewhere on device 10, or may be located (offloaded) on external equipment and conveyed to device 10 over a wired or wireless communications link.

Codebook 39 may identify each possible beam pointing angle that may be used by phased antenna array 36. Control circuitry 38 may store or identify phase and magnitude settings for phase and magnitude controllers 33 to use in implementing each of those beam pointing angles (e.g., control circuitry 38 or codebook 39 may include information that maps each beam pointing angle for phased antenna array 36 to a corresponding set of phase and magnitude values for phase and magnitude controllers 33). Codebook 39 may be hard-coded or soft-coded into control circuitry 38 or elsewhere in device 10, may include one or more databases stored at control circuitry 38 or elsewhere in device 10 (e.g., codebook 39 may be stored as software code), may include one or more look-up-tables at control circuitry 38 or elsewhere in device 10, and/or may include any other desired data structures stored in hardware and/or software on device 10. Codebook 39 may be generated during calibration of device 10 (e.g., during design, manufacturing, and/or testing of device 10 prior to device 10 being received by an end user) and/or may be dynamically updated over time (e.g., after device 10 has been used by an end user).

Control circuitry 38 may generate control signals S based on codebook 39. For example, control circuitry 38 may identify a beam pointing angle that would be needed to communicate with base station 11 of FIG. 3 (e.g., a beam pointing angle pointing towards base station 11). Control circuitry 38 may subsequently identify the beam pointing angle in codebook 39 that is closest to this identified beam pointing angle. Control circuitry 38 may use codebook 39 to generate phase and magnitude values for phase and magnitude controllers 33. Control circuitry 38 may transmit control signals S identifying these phase and magnitude values to phase and magnitude controllers 33 over control paths 34. The beam formed by phased antenna array 36 using control signals S will be oriented at the beam pointing angle identified by codebook 39. If desired, control circuitry 38 may sweep over some or all of the different beam pointing angles identified by codebook 39 until the external wireless equipment is found and may use the corresponding beam pointing angle at which the external wireless equipment was found to communicate with the external wireless equipment. Examples in which the antennas 30 that are used to convey radio-frequency signals in 5G NR communications bands for 5G NR transceiver circuitry 28 are arranged into one or more phased antenna arrays 36 are described herein as an example. However, if desired, one, more than one, or all of the antennas 30 that are used to convey radio-frequency signals in the 5G NR communications bands for 5G NR transceiver circuitry 28 may be independent antennas that do not form part of a larger phased antenna array.

Figure 5:
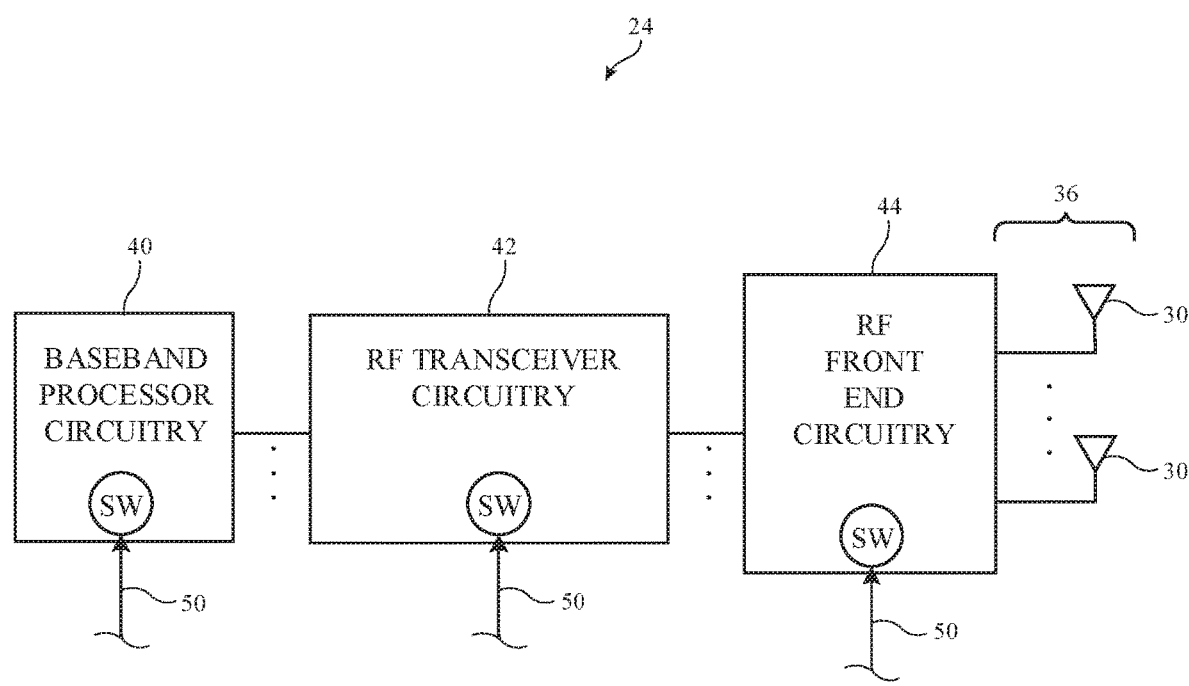
FIG. 5 is a diagram of illustrative wireless circuitry in accordance with some embodiments.

FIG. 5 is a schematic diagram of wireless circuitry 24 in device 10. As shown in FIG. 5, wireless circuitry 24 may include baseband processor circuitry 40, radio-frequency transceiver circuitry 42, radio-frequency front end circuitry 44, and one or more antennas 30 (e.g., multiple antennas 30 arranged in phased antenna array 36). Baseband processor circuitry 40 may transmit baseband data to radio-frequency (RF) transceiver circuitry 42 over data path(s) 46. Baseband processor 40 may receive baseband data from radio-frequency transceiver circuitry 42 over data path(s) 46. Radio-frequency transceiver circuitry 42 may form 5G NR transceiver circuitry 28 of FIG. 3, for example.

Radio-frequency transceiver circuitry 42 may generate radio-frequency signals (e.g., uplink signals) based on the baseband data received from baseband processor circuitry 40. The radio-frequency signals may be at frequencies in a 5G NR communications band and may include wireless data (e.g., uplink data) corresponding to the baseband data received from baseband processor circuitry 40. Radio-frequency transceiver circuitry 42 may transmit the uplink signals to radio-frequency front end circuitry 44 over radio-frequency path(s) 48. Radio-frequency transceiver circuitry 42 may also receive radio-frequency signals (e.g., downlink signals that include downlink data) from radio-frequency front end circuitry 44 over radio-frequency path(s) 48. Radio-frequency transceiver circuitry 42 may produce baseband data corresponding to the downlink data in the received downlink signals and may provide the baseband data to baseband processor circuitry 40 over data path(s) 46. Radio-frequency transceiver circuitry 42 may include amplifier circuitry (e.g., low noise amplifier circuitry, power amplifier circuitry, gain stage circuitry, etc.), mixer circuitry (e.g., up-converter and down-converter circuitry for converting between baseband frequencies, intermediate frequencies, and/or radio frequencies), signal conversion circuitry (e.g., analog-to-digital converter circuitry, digital-to-analog converter circuitry, etc.), and/or any other desired circuitry for producing radio-frequency signals 31 of FIG. 3 from baseband data and for producing baseband data from radio-frequency signals 31 of FIG. 3.

Radio-frequency front end circuitry 44 may include radio-frequency transmission line paths 32 of FIG. 4, filter circuitry (e.g., low pass filter circuitry, high pass filter circuitry, notch filter circuitry, band pass filter circuitry, etc.), switching circuitry, resistive components, capacitive components, inductive components, antenna tuning components (e.g., fixed and/or adjustable components for tuning the frequency response of antennas 30), amplifier circuitry, and/or any other desired radio-frequency front end circuitry for interfacing between antennas 30 and radio-frequency transceiver circuitry 42.

Wireless circuitry 24 may have multiple different wireless configurations. Each wireless configuration may identify settings for baseband processor 40, transceiver circuitry 42, front end circuitry 44, and/or antennas 30 to use in the transmission and reception of radio-frequency signals 31 of FIG. 3. Base station 11 (FIG. 3) may identify the wireless configuration for wireless circuitry 24 and may provide control signals to device 10 (e.g., using downlink control signals in radio-frequency signals 31 of FIG. 3) that instruct wireless circuitry 24 to use a particular wireless configuration. The wireless configuration to use may be determined by the network requirements of the communications network that includes device 10 and base station 11, the type of uplink and/or downlink data to be transmitted, the communications load on base station 11, the performance characteristics of device 10 and/or base station 11, etc.

Each wireless configuration may identify a corresponding communications schedule to be used by device 10 and base station 11 in conveying radio-frequency signals 31. The communications schedule may identify frequencies and timing to use for the transmission of uplink data, downlink data, uplink control signals, and/or downlink control signals using radio-frequency signals 31. The communications schedule may be arranged according to the 5G NR communications protocol or other communications protocols or standards governing the transmission and reception of radio-frequency signals 31.

The communications schedule may identify different operating (communications) states for wireless circuitry 24. Each operating state may include a particular configuration (setting) for baseband processor circuitry 40, radio-frequency transceiver circuitry 42, and/or radio-frequency front end circuitry 44. Baseband processor circuitry 40, radio-frequency transceiver circuitry 42, and radio-frequency front end circuitry 44 may each include switching circuitry such as switching circuitry SW. Switching circuitry SW may be adjusted by control signals provided by control circuitry 14 (FIG. 3) over control paths 50. Control circuitry 14 may use control paths 50 to adjust switching circuitry SW to place baseband processor circuitry 40, radio-frequency transceiver circuitry 42, and radio-frequency front end circuitry 44 into particular settings corresponding to the present operating state for wireless circuitry 24. In other words, control circuitry 14 may adjust switching circuitry SW to place wireless circuitry 24 in different operating states over time, based on the communications schedule for wireless circuitry 24. The communications schedule is determined by the wireless configuration identified by base station 11 for use by device 10 in conveying radio-frequency signals 31.

Figure 6:
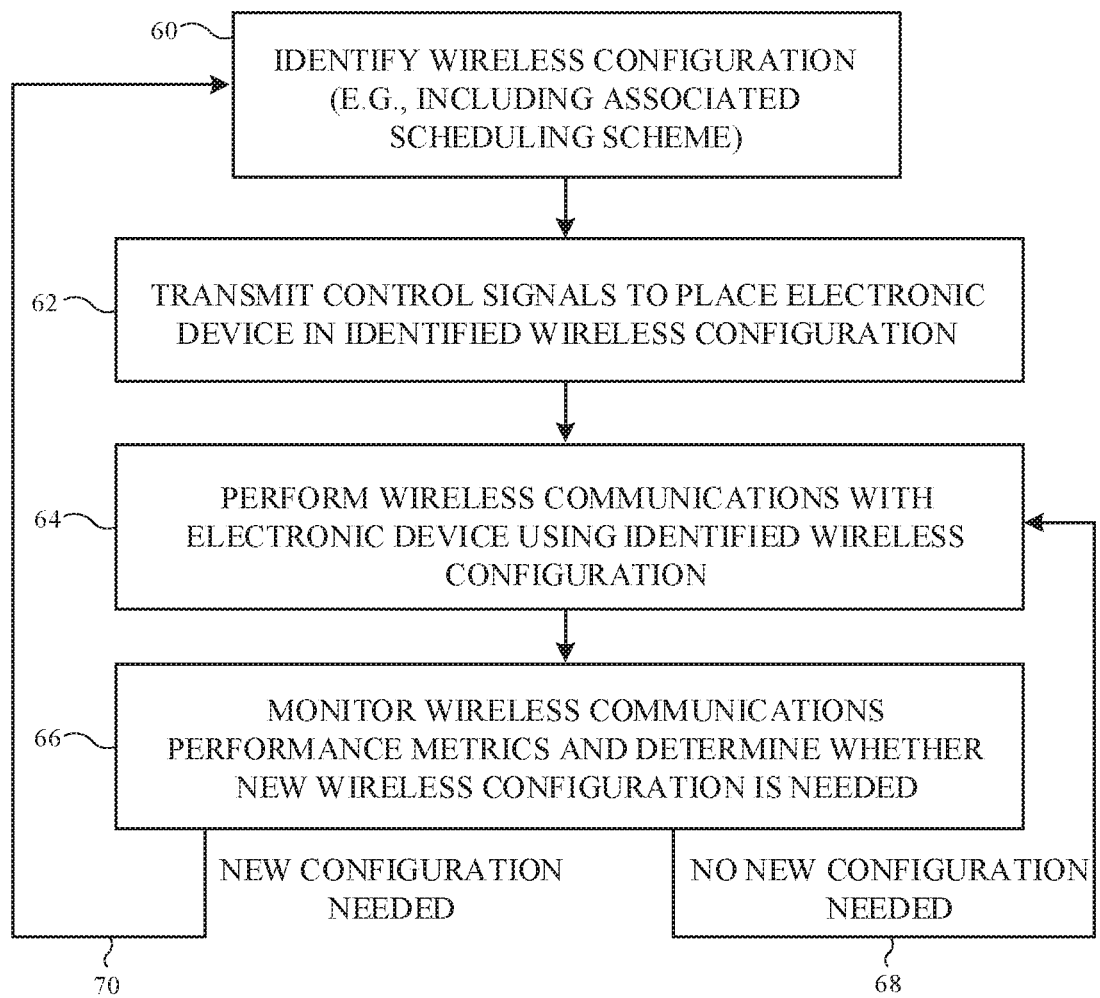
FIG. 6 is a flow chart of illustrative steps that may be performed by a wireless base station in communicating with an electronic device in accordance with some embodiments.

FIG. 6 is a flow chart of illustrative steps that may be performed by base station 11 in communicating with device 10. At step 60, base station 11 (or a network operator associated with base station 11) may identify a wireless configuration for device 10. The identified wireless configuration may include a corresponding communications schedule for device 10 (sometimes referred to herein as a scheduling scheme or communications scheduling scheme).

At step 62, base station 11 may transmit control signals to device 10 (e.g., downlink control signals in radio-frequency signals 31). The control signals may identify the wireless configuration and thus the communications schedule for device 10. Control circuitry 14 may place wireless circuitry 24 into the identified wireless configuration. This may involve adjusting switching circuitry SW of FIG. 5 to switch wireless circuitry 24 between different operating states over time according to the communications schedule (e.g., to transmit and receive radio-frequency signals 31 at certain frequencies at certain times according to the 5G NR communications protocol).

At step 64, base station 11 may perform wireless communications with device 10 using the identified wireless configuration and the corresponding communications schedule. This may involve the transmission of uplink data and uplink control signals (e.g., using uplink signals in radio-frequency signals 31) and/or the transmission of downlink data and downlink control signals (e.g., using downlink signals in radio-frequency signals 31).

At step 66, base station 11 may gather and monitor wireless communications performance metric information associated with radio-frequency signals 31. Base station 66 may gather measurements of link quality, signal strength, error rate, maximum power reduction (MPR), etc. from radio-frequency signals 31. If desired, device 10 may gather measurements of the link quality, signal strength, error rate, MPR, etc. from radio-frequency signals 31 and may provide those measurements to base station 11 (e.g., using uplink control signals in radio-frequency signals 31). Base station 11 may use the gathered wireless communications performance metric information to determine whether a new configuration is needed (e.g., to provide the wireless link with better performance over time). If no new wireless configuration is needed (e.g., if the performance of the wireless link is satisfactory), processing may loop back to step 64, as shown by arrow 68. If a new wireless configuration is needed (e.g., if the performance of the wireless link is unsatisfactory), processing may loop back to step 60, as shown by path 70, and a new wireless configuration for device 10 may be identified. Steps 64 and 66 may be performed concurrently if desired.

Figure 7:
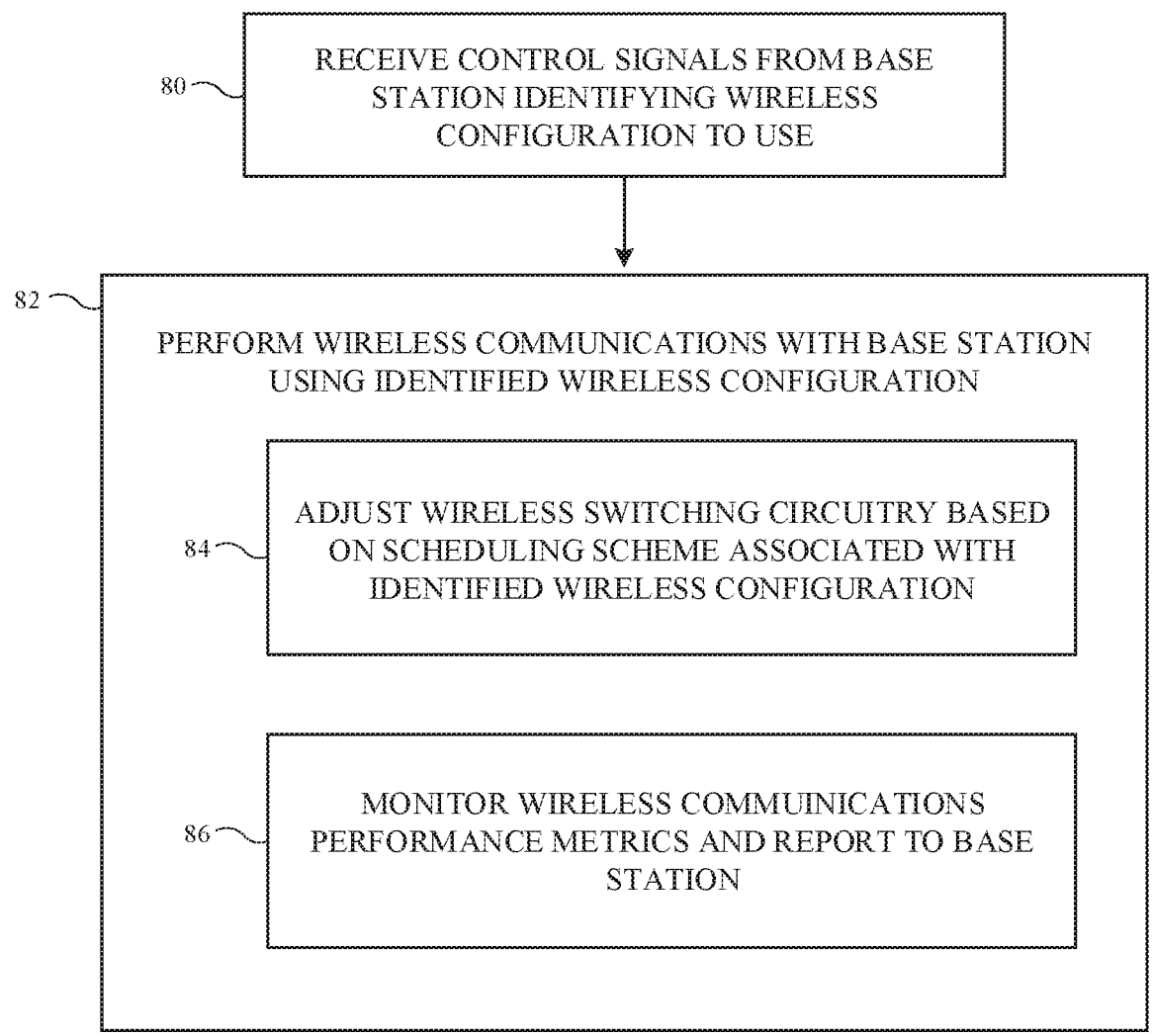
FIG. 7 is a flow chart of illustrative steps that may be performed by an electronic device in communicating with a wireless base station in accordance with some embodiments.

FIG. 7 is a flow chart of illustrative steps that may be performed by device 10 in communicating with base station 11. At step 80, device 10 may receive downlink control signals from base station 11 that identify the wireless configuration to use for wireless circuitry 24. The wireless configuration may identify a communications schedule for wireless circuitry 24.

At step 82, device 10 may perform wireless communications with base station 11 using the identified wireless configuration. This may include adjusting switching circuitry SW (FIG. 5) to switch wireless circuitry 24 between different operating states based on the scheduling scheme associated with the identified wireless configuration (step 84). Each operating state may involve transmission and/or reception of uplink data, downlink data, uplink control signals, and/or downlink control signals in one or more corresponding frequency ranges (sometimes referred to herein as component carriers). At the same time, device 10 may monitor (gather) wireless communications performance metric information associated with the radio-frequency signals 31 conveyed by antennas 30 (step 86). Device 10 may transmit (report) the wireless communications performance metric information to base station 11 using uplink control signals. Base station 11 may use the reported wireless communications performance metric information while processing step 66 of FIG. 6, for example.

Device 10 may perform wireless communications with base station 11 using a carrier aggregation (CA) scheme in which radio-frequency signals are concurrently conveyed in uplink and/or downlink directions at one or more different frequencies (e.g., using one or more different component carriers). For example, during wireless communications, device 10 may concurrently transmit uplink signals in multiple frequency ranges (e.g., using multiple different uplink component carriers). Device 10 may also concurrently receive downlink signals from base station 11 in multiple frequency ranges (e.g., using multiple different downlink component carriers).

In some scenarios, there may be asymmetry between uplink and downlink link budgets for device 10 and base station 11 and/or wireless link robustness may be enhanced by leveraging the propagation properties of widely separated uplink and downlink frequency ranges. Use of multiple frequency ranges (e.g., supplemental frequency ranges in addition to primary frequency ranges) may help to accommodate these scenarios. In one suitable arrangement that is sometimes described herein as an example, the supplemental frequency ranges may include component carriers in the FR2 frequency range of the 5G NR communications protocol. Configuring device 10 with supplemental frequency ranges in FR2 may allow the network to use Layer-1 (L1) signaling to efficiently allocate uplink resources across non-contiguous spectrum (e.g., either intra-band non-contiguous or inter-band). Alternatively, significantly slower handover or cell reselection radio resource control (RRC) procedures can be used. Because uplink resource allocation in supplemental uplink bands is often restricted to one supplemental uplink carrier over a given period, the radio-frequency architecture in device 10 that supports a single FR2 transmit path can be reused to support such band combinations, for example. There exists a performance benefit in such supplemental uplink band combinations over other carrier aggregation schemes in terms of MPR needed to meet regulatory emission limits: devices 10 that operate in supplemental uplink frequency combinations may only need to meet single-carrier emission requirements, whereas conventional uplink carrier aggregation involves additional (and significant) MPR, thereby reducing the available uplink link budget.

Figure 8:
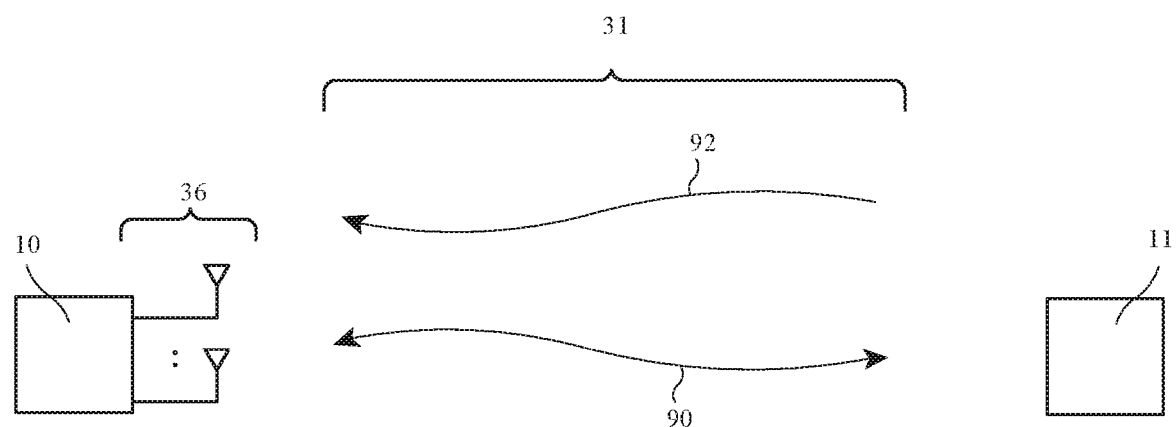
FIG. 8 is a diagram showing how an illustrative electronic device may communicate with a wireless base station using a low data rate component carrier while also receiving downlink signals using a supplemental high data rate component carrier in accordance with some embodiments.

FIG. 8 is a diagram showing how device 10 may communicate with base station 11 using a first (primary) frequency range and a second (supplemental) frequency range that is used to convey downlink signals. As shown in FIG. 8, device 10 may use phased antenna array 36 (or other antennas) to convey radio-frequency signals 31 to and from base station 11.

Radio-frequency signals 31 may include first radio-frequency signals 90 conveyed (e.g., bi-directionally) in a first frequency range (e.g., using a first component carrier). Radio-frequency signals 90 may be conveyed in uplink and downlink directions using a frequency division duplexing (FDD) and/or a time division duplexing (TDD) scheme. As an example, radio-frequency signals 90 may be conveyed using a component carrier in the FR1 frequency range of the 5G NR communications protocol. Because the FR1 frequency range is at relatively low frequencies, wireless data conveyed by radio-frequency signals 90 may be provided at a relatively low data rate.

Radio-frequency signals 31 may also include second radio-frequency signals 92 conveyed in a second frequency range (e.g., using a second component carrier different from the component carrier of radio-frequency signals 90). Radio-frequency signals 92 may be downlink signals transmitted by base station 11 using the second component carrier. Radio-frequency signals 92 may therefore sometimes be referred to herein as downlink signals 92 or supplemental downlink signals 92. As an example, supplemental downlink signals 92 may be conveyed using a component carrier in the FR2 frequency range of the 5G NR communications protocol. Because the FR2 frequency range is at relatively high frequencies, wireless data conveyed by supplemental downlink signals 92 may be provided at a relatively high data rate. At the same time, radio-frequency signals 90 may be more robust than supplemental downlink signals 92. In this way, device 10 may both transmit uplink traffic and receive downlink traffic using radio-frequency signals 90 (e.g., primary uplink and downlink signals conveyed using the first component carrier) while concurrently receiving supplemental downlink traffic from base station 11 using supplemental downlink signals 92.

The arrangement of FIG. 8 may allow device 10 to consume ultra-high data rate digital content (e.g., 4K streaming video, 8K streaming video, etc.) with minimal or no visible disruption to the digital content at device 10. The use of TDD FR2 carriers may require device 10 to meet challenging uplink and downlink requirements simultaneously at the cost of increased power consumption. For example, radio-frequency emission regulatory conformance may create situations with unequal uplink and downlink link budgets due to regulatory-related power back off. Consumption of battery power in device 10 may also limit sustained maximum transmit power. When provided with an arrangement of this type, device 10 may provide hybrid automatic repeat request (HARQ) feedback and uplink control data to base station 11 using radio-frequency signals 90 and can more efficiently utilize resources at device 10 and in the network, for example.

Figure 9:
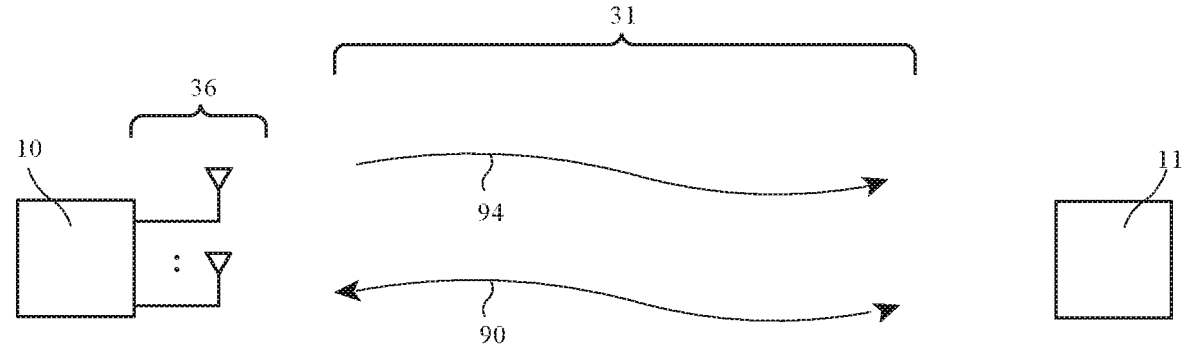
FIG. 9 is a diagram showing how an illustrative electronic device may communicate with a wireless base station using a low data rate component carrier while also transmitting uplink signals using a supplemental high data rate component carrier in accordance with some embodiments.

FIG. 9 is a diagram showing how device 10 may communicate with base station 11 using a first (primary) frequency range and a second (supplemental) frequency range that is used to convey uplink signals. As shown in FIG. 9, radio-frequency signals 90 may be conveyed in a first frequency range (e.g., using a first component carrier in the FR1 frequency range) between device 10 and base station 11. Radio-frequency signals 31 may also include second radio-frequency signals 94 conveyed in a second frequency range (e.g., using a second component carrier different in the FR2 frequency range). Radio-frequency signals 94 may be uplink signals transmitted by device 10 using the second component carrier. Radio-frequency signals 94 may therefore sometimes be referred to herein as uplink signals 94 or supplemental uplink signals 94. Because the FR2 frequency range is at relatively high frequencies, wireless data conveyed by supplemental uplink signals 94 may be provided at a relatively high data rate. At the same time, radio-frequency signals 90 may be more robust than supplemental uplink signals 94. In this way, device 10 may both transmit uplink traffic and receive downlink traffic using radio-frequency signals 90 (e.g., primary uplink and downlink signals con-veyed using the first component carrier) while concurrently transmitting supplemental uplink traffic to base station 11 using supplemental uplink signals 94.

The arrangement of FIG. 9 may allow device 10 to provide high data rate data such as real-time training data (e.g., for machine learning algorithms), user-streamed 4K or 8K video content, etc. The use of TDD FR2 carriers for this traffic may require device 10 to exhibit relatively high complexity and power consumption to maintain both link directions: device 10 may be required to support correspondence between uplink and downlink beamforming functions (e.g., so-called beam correspondence) and to maintain an active receiver chain to receive low-rate (and most control) downlink traffic. When provided with an arrangement of this type, HARQ feedback and downlink control signals may be routed over radio-frequency signals 90, which can more efficiently utilize user equipment and network resources than supplemental uplink signals 94, for example.

Figure 10:
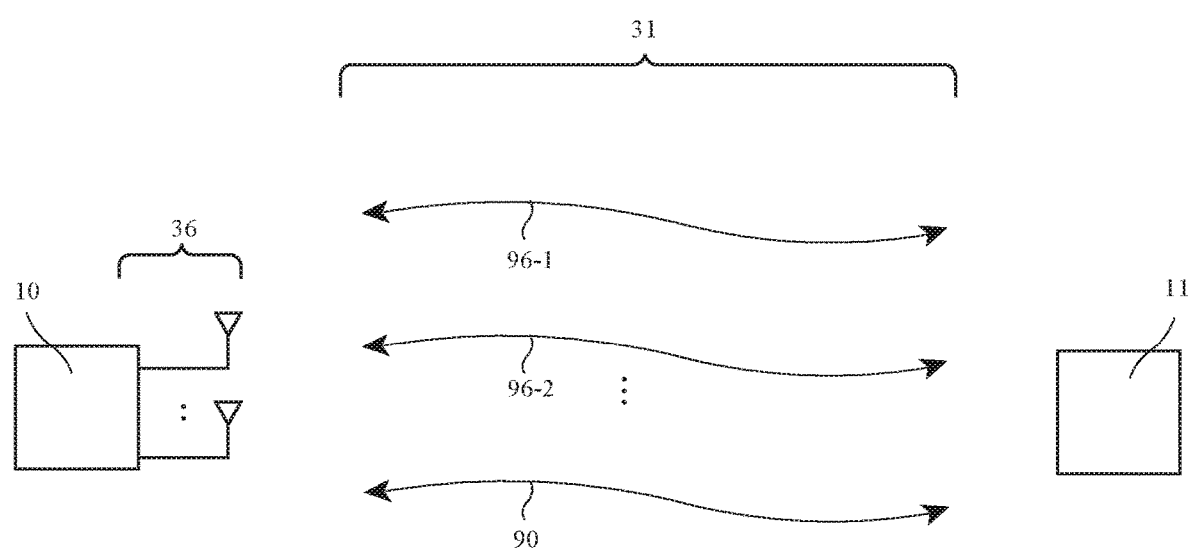
FIG. 10 is a diagram showing how an illustrative electronic device may communicate with a wireless base station using a low data rate component carrier and multiple supplemental high data rate component carriers in accordance with some embodiments.

FIG. 10 is a diagram showing how device 10 may communicate with base station 11 using a first (primary) frequency range and multiple supplemental frequency ranges. As shown in FIG. 10, radio-frequency signals 90 may be conveyed in a first frequency range (e.g., using a first component carrier in the FR1 frequency range) between device 10 and base station 11. Radio-frequency signals 31 may also include second radio-frequency signals 96 conveyed in multiple other (supplemental) frequency ranges (e.g., radio-frequency signals 96-1 conveyed using a first supplemental frequency range (component carrier) such as a first FR2 frequency range (component carrier), radio-frequency signals 96-2 conveyed using a second supplemental frequency range (component carrier) such as a second FR2 frequency range (component carrier), etc.). Radio-frequency signals 96 may therefore sometimes be referred to herein as supplemental signals 96.

Supplemental signals 96 may include uplink and/or downlink signals (e.g., supplemental signals 96-1 may include uplink and/or downlink signals, supplemental signals 96-2 may include uplink and/or downlink signals, etc.). Simultaneous uplink over one or more of supplemental signals 96 may be defined to optimize user equipment implementation complexity (e.g., at baseband processor circuitry 40, transceiver circuitry 42, and/or front end circuitry 44 of FIG. 5) and regulatory compliance. Simultaneous downlink over one or more of supplemental signals 96 may also be defined to optimize user equipment implementation complexity.

The allocation of millimeter wave spectrum globally faces challenges in terms of region-specific and nation-specific regulatory requirements to protect other uses (e.g., RADAR, astronomy, satellite services, etc.). This can introduce complex emission requirements and non-contiguous frequency ranges which represent intersections of available millimeter wave spectrum across all or a subset of regional/national regulators. Bidirectional consumption of bandwidth, as well as efficient resource allocation via component carrier (CC) activation/de-activation in a carrier aggregation mode of operation has led to an increase of carrier aggregation combinations in the 5G NR specification for FR2. In an effort to maintain flexibility of the carrier component activation/de-activation while retaining feasible complexity of the user equipment implementation in terms of compliance with regulatory emissions requirements, the NR RAT can be optimized to support the use of FR2 component carriers as supplemental uplink and downlink pairs (e.g., as shown in the arrangement of FIG. 10) rather than TDD component carrier pairs. This may, for example, allow device 10 to utilize a transmit chain supporting a single carrier (or a limited number of carriers) while complying with emissions requirements without excessive implementation complexity. Multiple supplemental downlink carriers may also be simultaneously enabled (active). Uplink and downlink HARQ feedback can be routed over the most robust lower-frequency carriers (e.g., in FR2 using supplemental signals 96 or in FR1 using radio-frequency signals 90 of FIG. 10).

Figure 11:
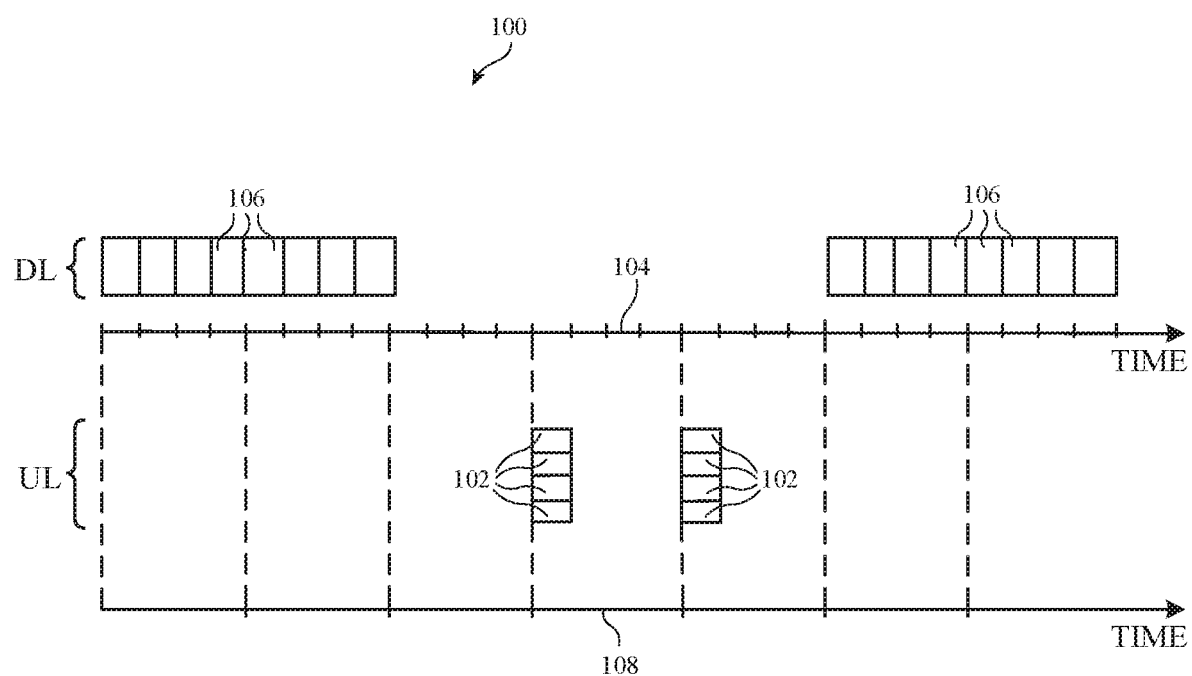
FIG. 11 is an illustrative timing diagram associated with receiving downlink signals using a first component carrier and transmitting corresponding feedback data using a second component carrier in accordance with some embodiments.

Device 10 and base station 11 may use radio-frequency signals 90 (e.g., the lower-rate component carrier) to transmit HARQ feedback in the direction opposite to the higher-rate supplemental component carrier (potentially with different subcarrier spacing). FIG. 11 is a timing diagram showing how device 10 may transmit HARQ feedback in the direction opposite to the higher rate supplemental component carrier (e.g., in the arrangement of FIG. 8 in which supplemental downlink signals 92 are transmitted by base station 11 in the FR2 frequency range).

As shown in FIG. 11, timing diagram 100 illustrates the time scheduling of base station 11 on horizontal (time) axis 104 and the time scheduling of device 10 on horizontal (time) axis 108. Transmit blocks 106 plotted on (over) time axis 104 are transmitted by base station 11 using supplemental downlink (DL) signals 92. Bundled HARQ feedback blocks 102 are transmitted by device 10 using uplink (UL) signals in radio-frequency signals 90 of FIG. 8.

Transmit blocks 106 may be associated with different HARQ processes. The supplemental downlink signals 92 used to convey transmit blocks 106 may be provided at a relatively high frequency component carrier such as a component carrier in the FR2 frequency range. Each increment mark on time axis 104 represents a corresponding data symbol (e.g., of supplemental downlink signals 92 of FIG. 8). Device 10 may receive transmit blocks 106 from base station 11 using the corresponding high frequency component carrier (e.g., a supplemental downlink component carrier in the FR2 frequency range).

Device 10 may produce HARQ feedback based on the transmit blocks 106 received from base station 11. Device 10 may bundle the HARQ feedback into bundled HARQ feedback blocks 102. Device 10 may transmit multiple bundles of HARQ feedback blocks 102 (e.g., until HARQ feedback for each transmit block 106 is provided to base station 11). Device 10 may transmit the bundles of HARQ feedback blocks 102 using a relatively low frequency component carrier such as a component carrier in the FR1 frequency range (e.g., using radio-frequency signals 90 of FIG. 8). Each increment mark on time axis 108 represents a corresponding data symbol (e.g., of radio-frequency signals 90 of FIG. 8). As shown by time axes 104 and 108, transmit blocks 106 are transmitted at a higher rate than the bundles of HARQ feedback blocks 102.

HARQ feedback may be calculated per transmit block 106 per multiple-input and multiple-output (MIMO) layer. In a band combination with a supplemental FR2 carrier, the downlink or uplink allocations of the corresponding supplemental FR2 link within a certain time period cannot exceed the HARQ feedback rate provided by the lower-frequency carrier (e.g., the carrier associated with time axis 108). Discontinuous supplemental carrier transmissions coupled with HARQ bundling, as illustrated in FIG. 11, may optimize the 5G NR RAT physical layer in device 10, for example.

Figure 12:
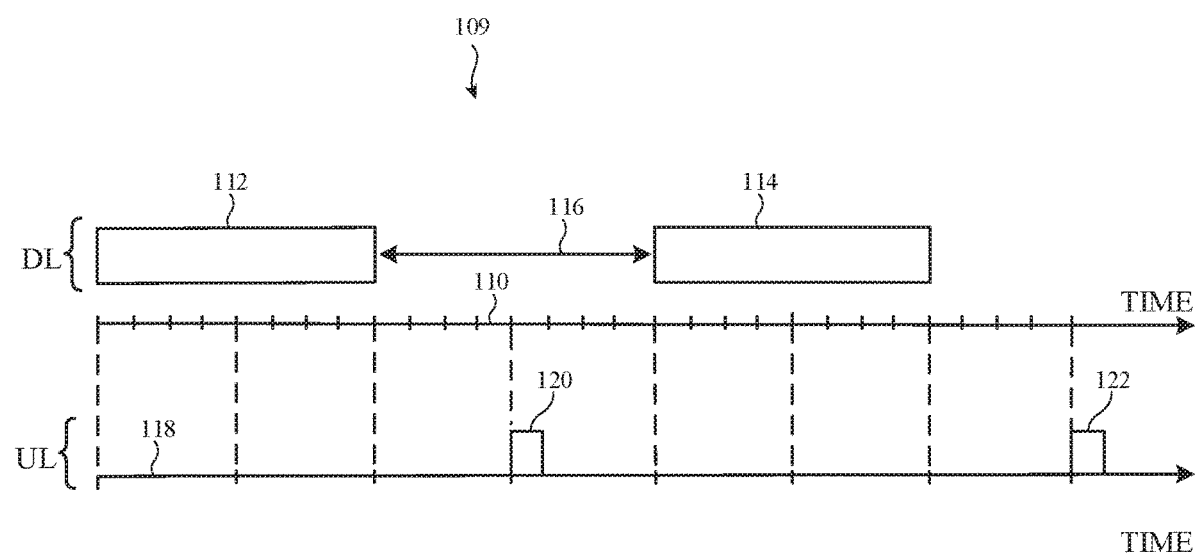
FIG. 12 is an illustrative timing diagram associated with receiving downlink signals using a first component carrier and transmitting a corresponding uplink report using a second component carrier in accordance with some embodiments.

FIG. 12 is a timing diagram showing how device 10 may transmit (uplink) control channel information in the direction opposite to the higher rate supplemental component carrier (e.g., in the arrangement of FIG. 8 in which supplemental downlink signals 92 are transmitted by base station 11 in the FR2 frequency range). As shown in FIG. 12, timing diagram 109 illustrates the time scheduling of base station 11 on horizontal (time) axis 110 and the time scheduling of device 10 on horizontal (time) axis 118.

Base station 11 may transmit downlink traffic, as shown by downlink block 112, using supplemental downlink signals 92 (e.g., using a component carrier in the FR2 frequency range). Device 10 may monitor the downlink traffic in downlink blocks 112 (e.g., during a monitoring period associated with the duration of downlink block 112). Device 10 may produce (uplink) control channel information such as uplink report 120 in response to monitoring downlink block 112. Uplink report 120 may include wireless performance metric information, HARQ feedback, measurement reports generated in response to receiving supplemental downlink signals 92, or other control information gathered or generated in response to reception of downlink block 112 at device 10. Device 10 may transmit uplink report 120 after base station 11 has finished transmission of downlink block 112. Device 10 may transmit uplink report 120 using uplink signals in radio-frequency signals 90 of FIG. 8 (e.g., using a component carrier in the FR1 frequency range). Base station 11 may, if desired, adjust the wireless link or perform any other desired operations based on uplink report 120.

Base station 11 may wait for configurable monitoring period gap 116 before transmitting downlink traffic using a subsequent downlink block 114. Base station 11 may adjust the duration of configurable monitoring period gap 116 to allow device 10 to have sufficient time to generate and transmit uplink report 120 (e.g., base station 11 may set gap 116 to a relatively long duration in scenarios where device 10 needs more time to produce uplink report 120 and may set gap 116 to a relatively short duration in scenarios where device 10 needs less time to produce uplink report 120). If desired, base station 11 may also adjust the duration of configurable monitoring period gap 116 to align the symbol timing of the component carrier of radio-frequency signals 90 with the timing of the component carrier of supplemental downlink signals 92. After configurable monitoring period gap 116, base station 11 may transmit downlink block 112 using supplemental downlink signals 92 (e.g., using the component carrier in the FR2 frequency range). Device 10 may monitor the downlink traffic in downlink block 114 (e.g., during a monitoring period defined by the duration of downlink block 114). Device 10 may produce control channel information such as uplink report 122 in response to monitoring downlink block 114. Device 10 may transmit uplink report 122 using uplink signals in radio-frequency signals 90 of FIG. 8 (e.g., using a component carrier in the FR1 frequency range).

Figure 13:
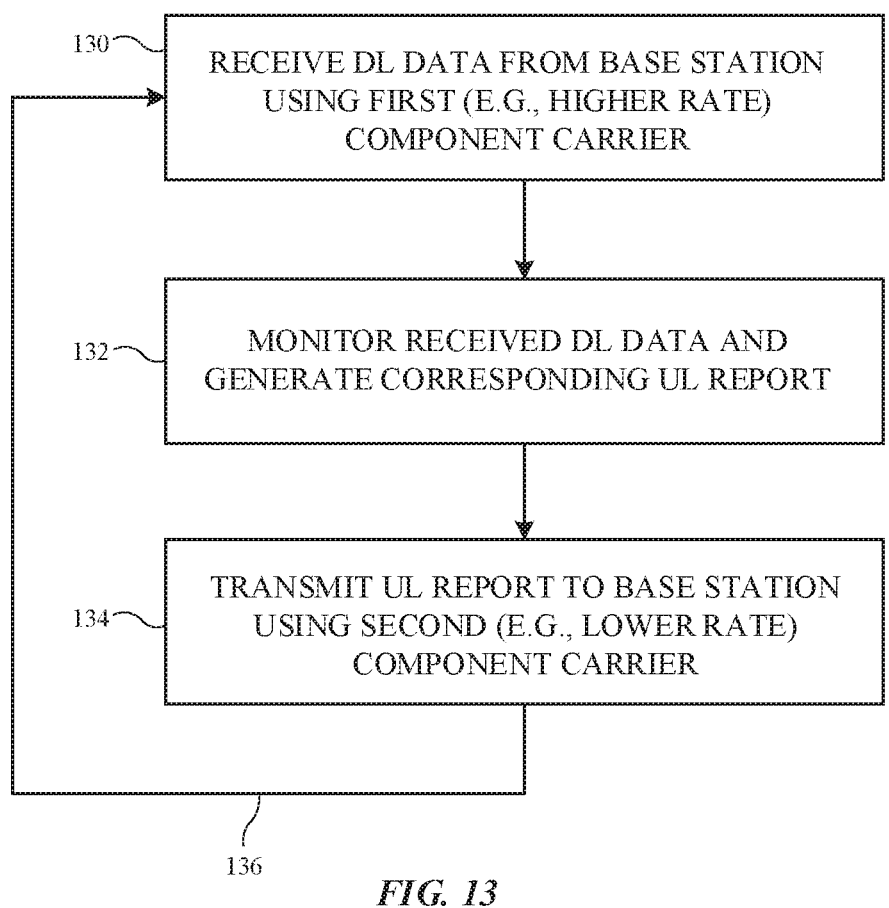
FIG. 13 is a flow chart of illustrative steps that may be performed by an electronic device in receiving downlink signals using a first component carrier and transmitting a corresponding uplink report using a second component carrier in accordance with some embodiments.

FIG. 13 is a flow chart of illustrative steps that may be performed by device 10 to transmit uplink control channel information in the direction opposite to the higher rate supplemental component carrier (e.g., using the timing scheme shown in FIG. 12). At step 130, device 10 may receive downlink data from base station 11 (e.g., in downlink block 112 of FIG. 12) using supplemental downlink signals 92 (FIG. 8). The supplemental downlink signals may be conveyed using a first (relatively high) component carrier such as a component carrier in the FR2 frequency range. The supplemental downlink signals may be relatively high rate signals.

At step 132, device 10 (e.g., control circuitry 14 of FIG. 3) may monitor the received downlink data and may generate a corresponding uplink report (e.g., uplink report 120 of FIG. 12). Step 132 may be performed concurrently with step 130.

At step 134 (e.g., during configurable monitoring period gap 116), device 10 may transmit uplink report 120 (and any other desired control channel information) to base station 11 using radio-frequency signals 90 (FIG. 8). The uplink report may, for example, be included in uplink signals in radio-frequency signals 90. The uplink signals may be conveyed using a second (relatively low) component carrier such as a component carrier in the FR1 frequency range. These uplink signals may be relatively low rate signals (e.g., may have a lower data rate than the supplemental downlink signals). Processing may loop back to step 130, as shown by arrow 136, as more supplemental downlink signals are received.

Figure 14:
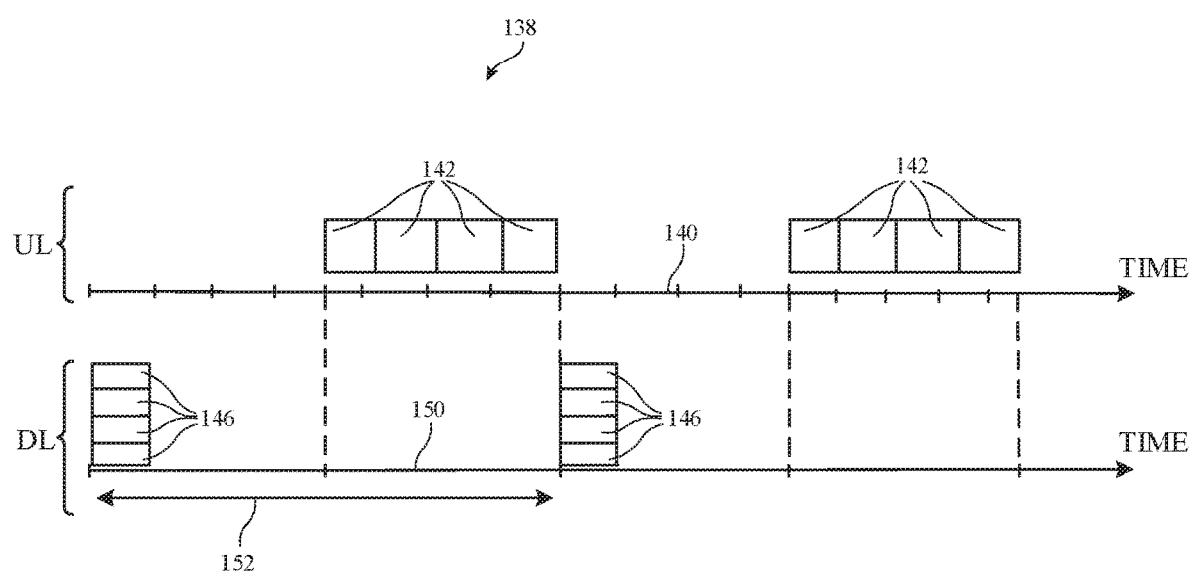
FIG. 14 is an illustrative timing diagram associated with receiving downlink control information using a first component carrier and transmitting corresponding uplink signals using a second component carrier in accordance with some embodiments.

FIG. 14 is a timing diagram showing how base station 11 may transmit (downlink) control channel information in the direction opposite to the higher rate supplemental component carrier (e.g., in the arrangement of FIG. 9 in which supplemental uplink signals 94 are transmitted by device 10 in the FR2 frequency range). As shown in FIG. 14, timing diagram 138 illustrates the time scheduling of base station 11 on horizontal (time) axis 150 and the time scheduling of device 10 on horizontal (time) axis 140.

Device 10 may transmit uplink data blocks 142 using supplemental uplink signals 94 (FIG. 8). Device 10 may transmit uplink data blocks 142 (supplemental uplink signals 94) using a relatively high component carrier such as a component carrier in the FR2 frequency range. Base station 11 may transmit bundled downlink control indicators (DCIs) 146 preceding each sequence of uplink data blocks 142 transmitted by device 10. For example, base station 11 may transmit bundled downlink control indicators 146 for multiple FR2 supplemental uplink slots into a single transmission over radio-frequency signals 90 (e.g., downlink signals in radio-frequency signals 90 of FIG. 9 that are conveyed using a relatively low component carrier such as a component carrier in the FR1 frequency range). Base station 11 may transmit bundled downlink control indicators 146 using configurable bundled DCI period 152. Base station 11 may adjust the duration of period 152 (e.g., similar to configurable monitoring period gap 116 of FIG. 12). In this way (e.g., as described in the examples of FIGS. 12-14), device 10 and base station 11 may perform cross-carrier scheduling of reporting (e.g., across FR1 and FR2 component carriers).

Figure 15:
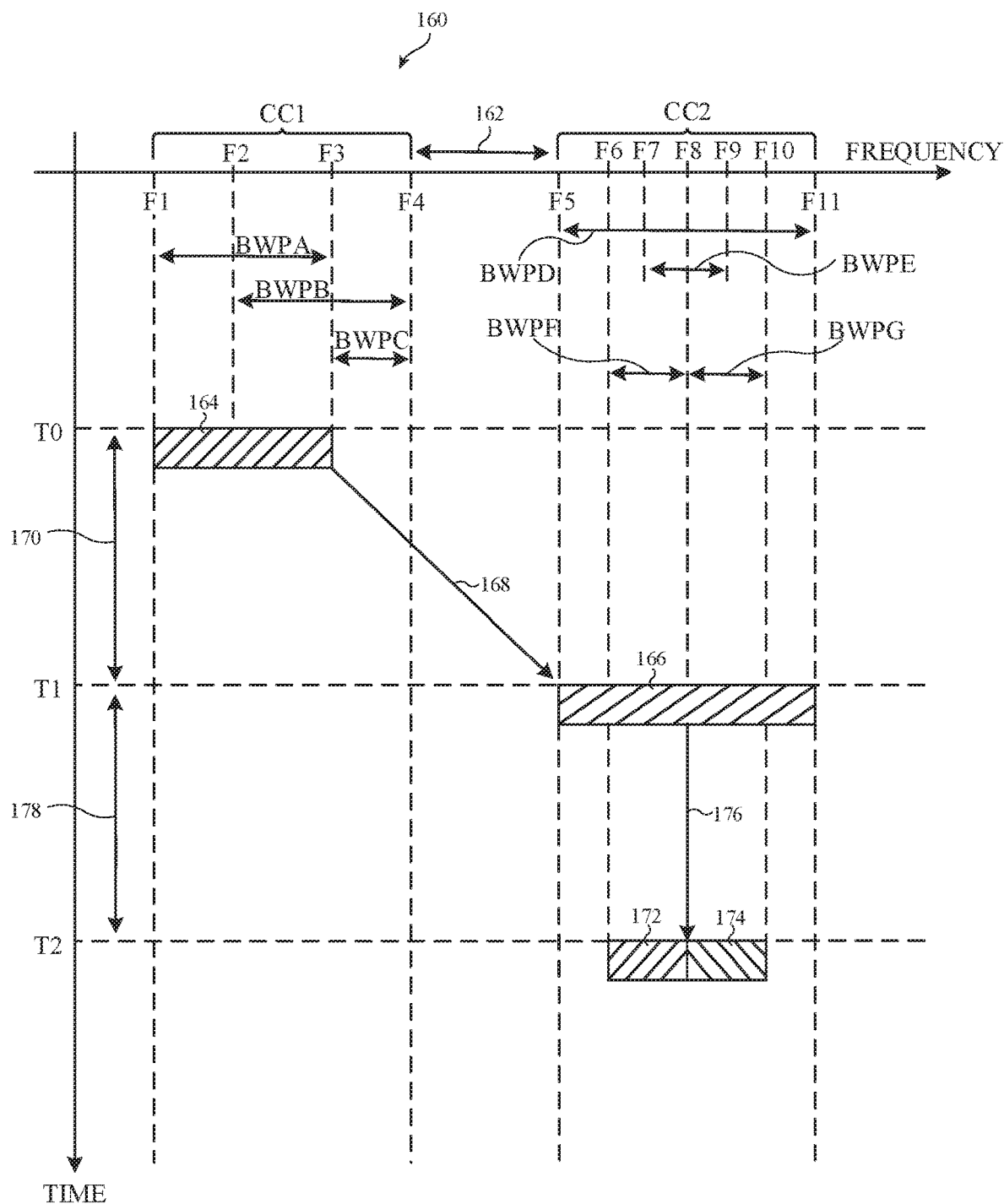
FIG. 15 is an illustrative scheduling diagram associated with controlling an electronic device to switch bandwidth part configurations between component carriers while transmitting uplink signals in accordance with some embodiments.

If desired, device 10 and base station 11 may perform wireless communications while switching between multiple bandwidth part (BWP) configurations. FIG. 15 is a scheduling diagram showing how device 10 may switch between BWP configurations in communicating with base station 11. As shown in FIG. 15, scheduling diagram 160 plots frequency on the horizontal axis and time on the vertical axis.

Device 10 and base station 11 may communicate within a first frequency range such as first component carrier CC1 and within a second frequency range such as second component carrier CC2. Component carrier CC1 extends from frequency F1 to frequency F4 whereas component carrier CC2 extends from frequency F5 to frequency F10. The bandwidth of component carrier CC1 is defined as the difference between frequency F4 and frequency F1 whereas the bandwidth of component carrier CC2 is defined as the difference between frequency F10 and frequency F5. Component carrier CC1 may be separated from component carrier CC2 by frequency separation 162.

Component carriers CC1 and CC2 may lie within different frequency bands (e.g., frequency/communications bands as defined by the 5G NR communications protocol), such as bands in the FR1 and/or FR2 frequency ranges. In these scenarios, frequency separation 162 includes at least the distance in frequency between each of the bands (e.g., component carriers CC1 and CC2 may be inter-band component carriers). In another suitable arrangement, component carriers CC1 and CC2 may lie within the same frequency band (e.g., within the same frequency/ communications band as defined by the 5G NR communications protocol). For example, component carriers CC1 and CC2 may both lie within the same band in the FR2 frequency range. In these scenarios, frequency separation 162 may be non-zero, such that component carriers CC1 and CC2 are non-contiguous intra-band component carriers of the band, or frequency separation 162 may be zero, such that component carriers CC1 and CC2 are contiguous intra-band component carriers of the band. The difference between frequency F10 and frequency F1 defines the frequency separation class of component carriers CC1 and CC2. In scenarios where component carriers CC1 and CC2 are non-contiguous intra-band component carriers, the frequency separation class of component carriers CC1 and CC2 may be values in the range of 800 to 1400 MHz (in NR Release 15) and in the range of 800 to 2400 MHz (in NR Release 16), as just two examples.

Component carriers CC1 and CC2 may each include multiple bandwidth parts (BWPs). Each bandwidth part may extend (in frequency) across some or all of the bandwidth of its corresponding component carrier (e.g., each bandwidth part may include a set of resource blocks of the corresponding component carrier). The bandwidth parts for each component carrier may, for example, be specified by the communications protocol governing communications between device 10 and base station 11 (e.g., the 5G NR communications protocol).

In the example of FIG. 15, component carrier CC1 has three bandwidth parts BWPA, BWPB, and BWPC whereas component carrier CC2 has four bandwidth parts BWPD, BWPE, BWPF, and BWPG. Bandwidth part BWPA extends from frequency F1 to frequency F3 within component carrier CC1, bandwidth part BWPB extends from frequency F2 to frequency F4 within component carrier CC1, and bandwidth part BWPC extends from frequency F3 to frequency F4 within component carrier CC1. Bandwidth part BWPD extends from frequency F5 to frequency F11 within component carrier CC2 (e.g., across an entirety of component carrier CC2), bandwidth part BWPE extends from frequency F7 to frequency F9 within component carrier CC2, bandwidth part BWPF extends from frequency F6 to frequency F8 within component carrier CC2, and bandwidth part BWPG extends from frequency F8 to frequency F10 within component carrier CC2. This is merely illustrative and, in general, the component carriers may include a number of configured bandwidth parts having any desired bandwidths extending between any desired frequencies (e.g., as allowed by the 3GPP NR physical layer specification).

Wireless circuitry 24 may have respective bandwidth part configurations (states) that configure wireless circuitry 24 to convey radio-frequency signals using the different bandwidth parts of component carriers CC1 and CC2. For example, wireless circuitry 24 may have a first bandwidth part configuration (state) in which wireless circuitry 24 conveys radio-frequency signals using bandwidth part configuration BWPA, may have a second bandwidth part configuration (state) in which wireless circuitry 24 conveys radio-frequency signal using bandwidth part configuration BWPB, may have a third bandwidth part configuration (state) in which wireless circuitry 24 conveys radio-frequency signals using bandwidth part configuration BWPE, etc. In potential future arrangements, wireless circuitry 24 may also have states in which multiple bandwidth parts of the same component carrier are concurrently active. Each bandwidth part configuration may include corresponding settings for baseband processor circuitry 40, transceiver circuitry 42, and/or front end circuitry 44 of FIG. 5. Control circuitry 14 (FIG. 3) may switch wireless circuitry 24 between the different bandwidth part configurations (e.g., may place wireless circuitry 24 into a desired bandwidth part configuration or operating state) by adjusting switching circuitry SW of FIG. 5, for example.

In practice, network activation of bandwidth parts within component carriers CC1 and CC2 (e.g., within component carriers in the FR2 frequency range) may be restricted. For example, multiple bandwidth parts may not be active in both component carriers CC1 and CC2 at the same time. However, in potential future arrangements, multiple bandwidth parts may be active within the same component carrier at the same time if desired. Bandwidth part switching time may also be needed to reconfigure (switch) wireless circuitry 24 between different bandwidth part configurations. During communications, wireless circuitry 24 may switch between bandwidth part configurations across component carriers CC1 and CC2 over time and/or may switch between bandwidth part configurations within one of component carriers CC1 and CC2. This switching operation causes an interruption to the transmit and receive function of device 10, which may thereby require the network scheduler to allocate sufficient time for the switching operation across the component carriers.

Scheduling diagram 160 shows an example of uplink scheduling for device 10 in performing bandwidth part switching operations between component carriers. As shown by block 164, bandwidth part BWPA may be active at time T0. Wireless circuitry 24 may be placed in a state (bandwidth part configuration) that configures the wireless circuitry to transmit uplink signals using bandwidth part BWPA of component carrier CC1 (e.g., bandwidth part BWPA may be active at time T0).

Wireless circuitry 24 may then switch to a bandwidth part configuration of component carrier CC2 (e.g., based on the scheduling scheme provided to device 10 by base station 11), as shown by arrow 168. At time T1, wireless circuitry 24 may transmit uplink signals using bandwidth part BWPD of component carrier CC2 (e.g., bandwidth part BWPD may be active at time T1). There may be a bandwidth part switching time 170 between the uplink signal transmissions associated with blocks 164 and 166 that allows wireless circuitry 24 sufficient time to switch between the bandwidth part configuration for bandwidth part BWPA and the bandwidth part configuration for bandwidth part BWPD (e.g., sufficient time to adjust switching circuitry SW of FIG. 5). Bandwidth part switching time 170 may also allow time to retune antennas 30 to cover the active component carrier, synchronization delay, system information dreading delay, and/or baseband re-configuration delay if desired.

Wireless circuitry 24 may then switch to a different bandwidth part configuration of component carrier CC2 (e.g., based on the scheduling scheme provided to device 10 by base station 11), as shown by arrow 176. At time T2, wireless circuitry 24 may transmit uplink signals using both bandwidth parts BWPF and BWPG of component carrier CC2 (e.g., bandwidth parts BWPF and BWPG may be active at time T2). There may be a bandwidth part switching time 178 between the uplink signal transmissions at times T1 and T2 that allows wireless circuitry 24 sufficient time to switch between the bandwidth part configuration for bandwidth part BWPA and the bandwidth part configuration for bandwidth parts BWPF and BWPG (e.g., sufficient time to adjust switching circuitry SW of FIG. 5). Bandwidth part switching time 178 may also allow time to retune antennas 30 to cover the active component carrier, synchronization delay, system information dreading delay, and/or baseband re-configuration delay if desired. The bandwidth part switching associated with arrow 176 illustrates how device 10 may switch between bandwidth part configurations within the same component carrier and how device 10 may transmit signals using multiple bandwidth parts of the same component carrier at the same time if desired.

The example of FIG. 15 is merely illustrative. Device 10 may continue to switch between different bandwidth part configurations of component carriers CC1 and/or CC2 over time (e.g., based on the scheduling scheme provided by base station 11). Device 10 may switch between any desired combinations of bandwidth parts of component carriers CC1 and CC2 (e.g., so long as bandwidth parts in both component carriers CC1 and CC2 are not simultaneously active).

Figure 16:
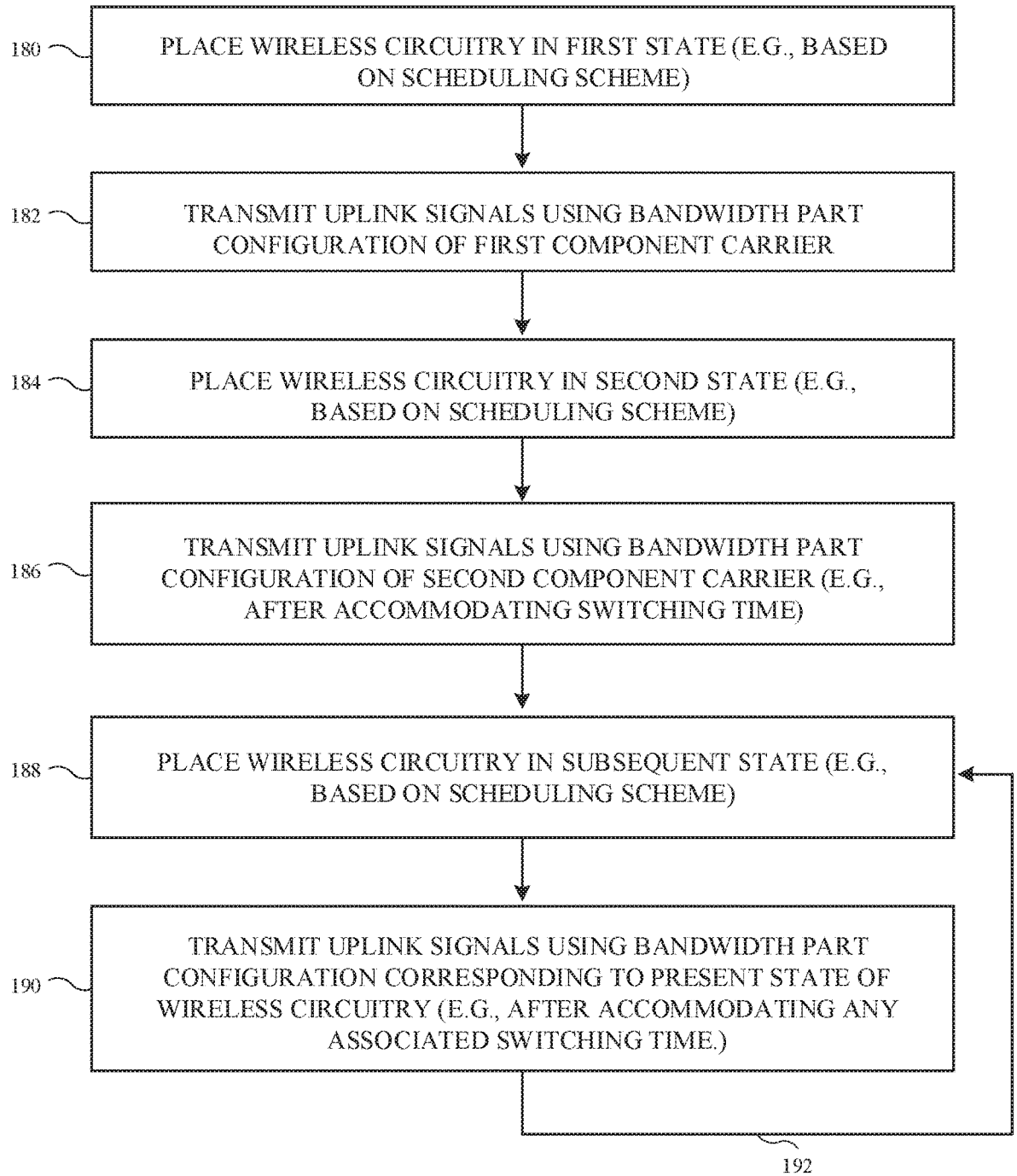
FIG. 16 is a flow chart of illustrative steps that may be performed by an electronic device in switching bandwidth part configurations between component carriers while transmitting uplink signals in accordance with some embodiments.

FIG. 16 is a flow chart of illustrative steps that may be performed by device 10 to perform bandwidth part switching between component carriers CC1 and CC2 (e.g., based on the scheduling diagram of FIG. 15). At step 180, control circuitry 14 (FIG. 3) may place wireless circuitry 24 in a first state (e.g., in a first bandwidth part configuration based on the scheduling scheme received from base station 11 while processing step 80 of FIG. 7). For example, control circuitry 14 may control switching circuitry SW in wireless circuitry 24 to configure wireless circuitry 24 to convey radio-frequency signals in a bandwidth part of component carrier CC1, such as bandwidth part BWPA of FIG. 15.

At step 182, wireless circuitry 24 may transmit uplink signals (e.g., uplink signals that convey uplink data) using the bandwidth part of component carrier CC1 (e.g., using bandwidth part BWPA).

At step 184, control circuitry 14 may place wireless circuitry in a second state (e.g., in a second bandwidth part configuration). For example, control circuitry 14 may control switching circuitry SW in wireless circuitry 24 to re-configure wireless circuitry 24 to convey radio-frequency signals in a bandwidth part of component carrier CC2, such as bandwidth part BWPE of FIG. 15. Wireless circuitry 24 may, for example, be re-configured during bandwidth part switching time 170 of FIG. 15.

At step 186, wireless circuitry 24 may transmit uplink signals (e.g., uplink signals that convey uplink data) using the bandwidth part of component carrier CC2 (e.g., using bandwidth part BWPE).

At step 188, control circuitry 14 may place wireless circuitry in a subsequent state (e.g., in a subsequent bandwidth part configuration). For example, control circuitry 14 may control switching circuitry SW in wireless circuitry 24 to re-configure wireless circuitry 24 to convey radio-frequency signals in bandwidth parts BWPF and BWPG of component carrier CC2 (e.g., as shown by blocks 172 and 174 of FIG. 15). Wireless circuitry 24 may, for example, be re-configured during bandwidth part switching time 178 of FIG. 15.

At step 190, wireless circuitry 24 may transmit uplink signals (e.g., uplink signals that convey uplink data) using the subsequent bandwidth part configuration (e.g., using bandwidth parts BWPF and BWPG). Processing may subsequently loop back to step 188, as shown by arrow 192. Device 10 may continue to switch between bandwidth part configurations of component carriers CC1 and/or CC2 during uplink communications with base station 11.

Figure 17:
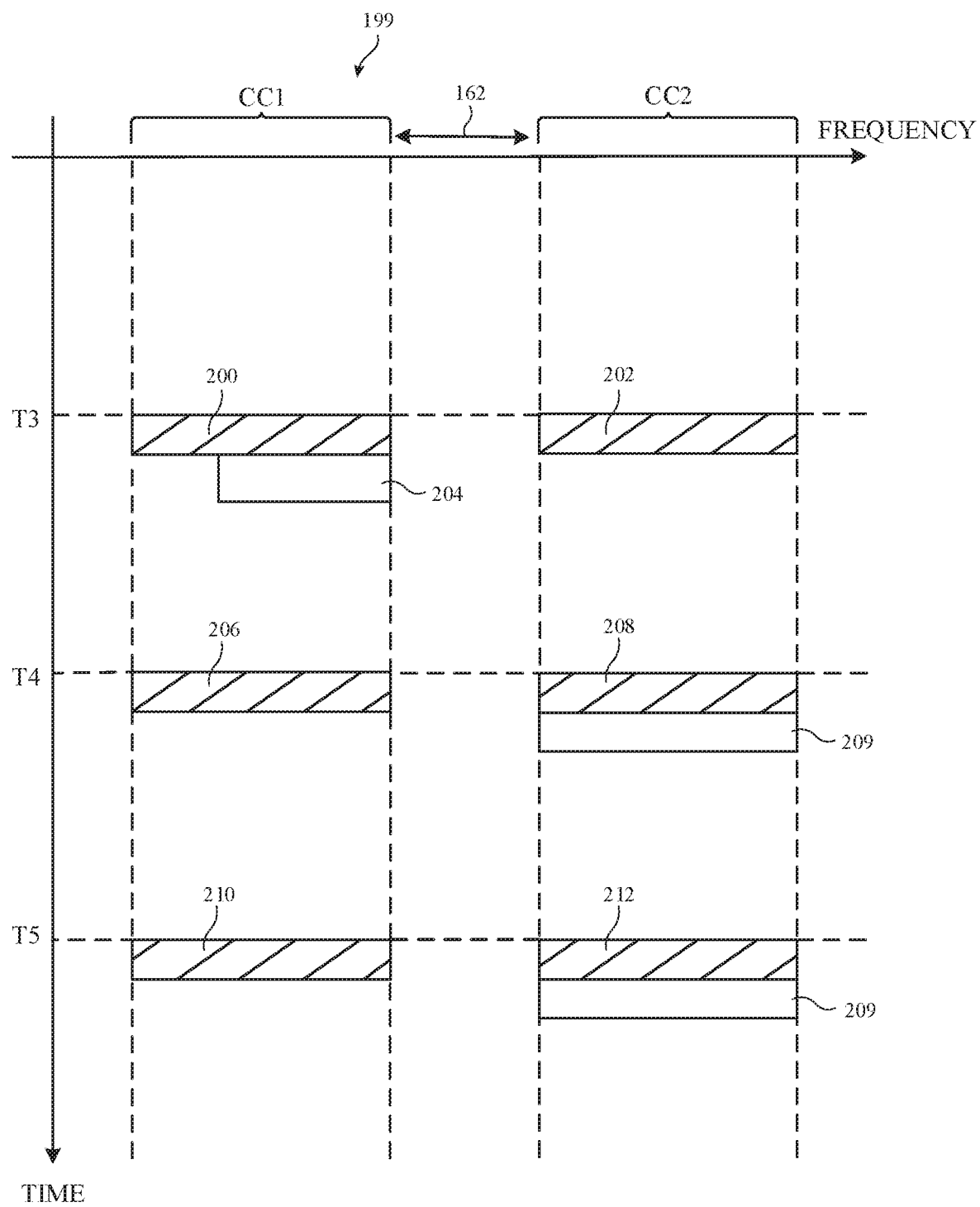
FIG. 17 is an illustrative scheduling diagram associated with switching between component carriers for performing downlink data monitoring and uplink report transmission in accordance with some embodiments.

If desired, device 10 may switch between component carriers CC1 and CC2 for performing downlink carrier monitoring and reporting. FIG. 17 is a scheduling diagram showing how device 10 may switch between bandwidth part configurations of component carriers CC1 and CC2 for performing downlink carrier monitoring and reporting. As shown in FIG. 17, scheduling diagram 199 plots frequency on the horizontal axis and time on the vertical axis.

As shown in scheduling diagram 199 of FIG. 17, shaded blocks 200, 202, 206, 208, 210, and 212 represent active downlink bandwidth part configurations for base station 11. At time T3, base station 11 may concurrently transmit downlink signals using bandwidth parts in both component carriers CC1 and CC2 (as shown by blocks 200 and 202). The bandwidth parts corresponding to blocks 200 and 202 may extend across some or all of the bandwidth of component carriers CC1 and CC2. Device 10 may monitor (measure) the bandwidth part of block 200 in component carrier CC1 to produce a corresponding uplink report associated with those downlink signals.

At the same time, device 10 may have an active uplink bandwidth part configuration in component carrier CC1, as shown by block 204. The bandwidth part associated with block 204 may have a bandwidth that is less than the bandwidth associated with block 200. Device 10 may transmit the uplink report generated from monitoring the bandwidth part associated with block 200 using the bandwidth part associated with block 204 (e.g., a bandwidth part in component carrier CC1 such as bandwidth parts BWPA, BWPB, or BWPC of FIG. 15). Device 10 may then switch its uplink bandwidth part configuration to a bandwidth part configuration of component carrier CC2.

At time T4, base station 11 may concurrently transmit downlink signals using bandwidth parts in both component carriers CC1 and CC2 (as shown by blocks 206 and 208). The bandwidth parts corresponding to blocks 206 and 208 may extend across some or all of the bandwidth of component carriers CC1 and CC2. Device 10 may monitor (measure) the bandwidth part of block 206 in component carrier CC1 to produce a corresponding uplink report associated with those downlink signals.

At the same time, device 10 may have an active uplink bandwidth part configuration in component carrier CC2, as shown by block 209. The bandwidth part associated with block 209 may have a bandwidth that is equal to or less than the bandwidth part associated with block 208. Device 10 may transmit the uplink report generated from monitoring the bandwidth part associated with block 206 using the bandwidth part associated with block 209 (e.g., a bandwidth part in component carrier CC21 such as bandwidth parts BWPD, BWPE, BWPF, and/or BWPG of FIG. 15). Device 10 may then switch its downlink bandwidth part configuration to a bandwidth part configuration of component carrier CC2.

At time T5, base station 11 may concurrently transmit downlink signals using bandwidth parts in both component carriers CC1 and CC2 (as shown by blocks 210 and 212). The bandwidth parts corresponding to blocks 210 and 212 may extend across some or all of the bandwidth of component carriers CC1 and CC2. Device 10 may monitor (measure) the bandwidth part of block 212 in component carrier CC2 to produce a corresponding uplink report associated with those downlink signals. Device 10 may transmit the uplink report generated from monitoring the bandwidth part associated with block 212 using the bandwidth part associated with block 209 (in component carrier CC2).

The example of FIG. 17 is merely illustrative. Device 10 may continue to switch between different bandwidth part configurations of component carriers CC1 and/or CC2 over time (e.g., based on the scheduling scheme provided by base station 11). Device 10 may switch between any desired combinations of bandwidth parts of component carriers CC1 and CC2 for performing downlink carrier monitoring and reporting (e.g., so long as bandwidth parts in both component carriers CC1 and CC2 are not simultaneously active). The uplink reports transmitted using the bandwidth part configurations associated with blocks 204 and 209 may include any desired uplink control channel information such as radio resource management (RRM) reports, physical layer reports, etc. The uplink reports may include signal quality information, beam management information, wireless performance metric information, and/or any other desired monitoring information gathered from the downlink signals.

Figure 18:
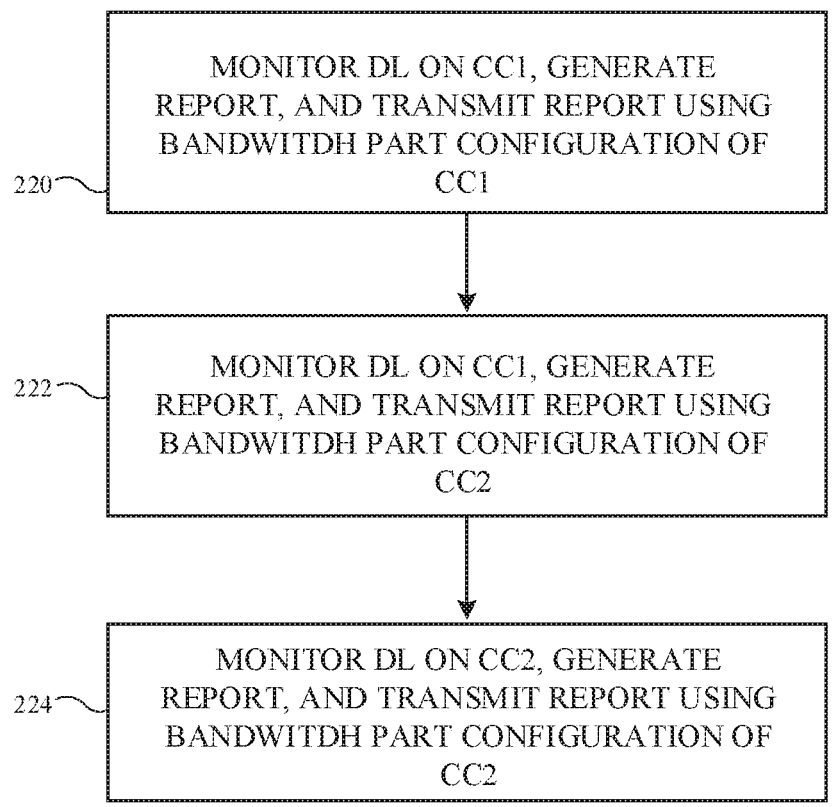
FIG. 18 is a flow chart of illustrative steps that may be performed by an electronic device in switching between component carriers for performing downlink data monitoring and uplink report transmission in accordance with some embodiments.

FIG. 18 is a flow chart of illustrative steps that may be performed by device 10 in switching between bandwidth part configurations of component carriers CC1 and CC2 for performing downlink carrier monitoring and reporting (e.g., based on the scheduling diagram of FIG. 17). At step 220, control circuitry 14 may monitor downlink signals using the bandwidth part configuration associated with block 200 of component carrier CC1. Control circuitry 14 may generate uplink control channel information (e.g., an uplink report) based on the monitored downlink signals. Wireless circuitry 24 may transmit the generated uplink report using a bandwidth part configuration associated with component carrier CC1, such as the bandwidth part configuration associated with block 204 of FIG. 17. Wireless circuitry 24 may subsequently switch its uplink bandwidth part configuration to a bandwidth part configuration of component carrier CC2.

At step 222, control circuitry 14 may monitor downlink signals using the bandwidth part configuration associated with block 206 of component carrier CC1. Control circuitry 14 may generate uplink control channel information (e.g., an uplink report) based on the monitored downlink signals. Wireless circuitry 24 may transmit the generated uplink report using the bandwidth part configuration associated with component carrier CC2 (e.g., the bandwidth part configuration associated with block 209 of FIG. 17). Wireless circuitry 24 may subsequently switch its downlink bandwidth part configuration to a bandwidth part configuration of component carrier CC2.

At step 224, control circuitry 14 may monitor downlink signals using the bandwidth part configuration associated with block 212 of component carrier CC2. Control circuitry 14 may generate uplink control channel information (e.g., an uplink report) based on the monitored downlink signals. Wireless circuitry 24 may transmit the generated uplink report using the bandwidth part configuration associated with component carrier CC2 (e.g., the bandwidth part configuration associated with block 209 of FIG. 17).

The examples of FIGS. 17 and 18 in which device 10 monitors downlink signals in only one of component carriers CC1 and CC2 for generating uplink control channel information at any given time is merely illustrative. If desired, device 10 may concurrently monitor downlink signals in both component carriers CC1 and CC2 for generating uplink control channel information.

Figure 19:
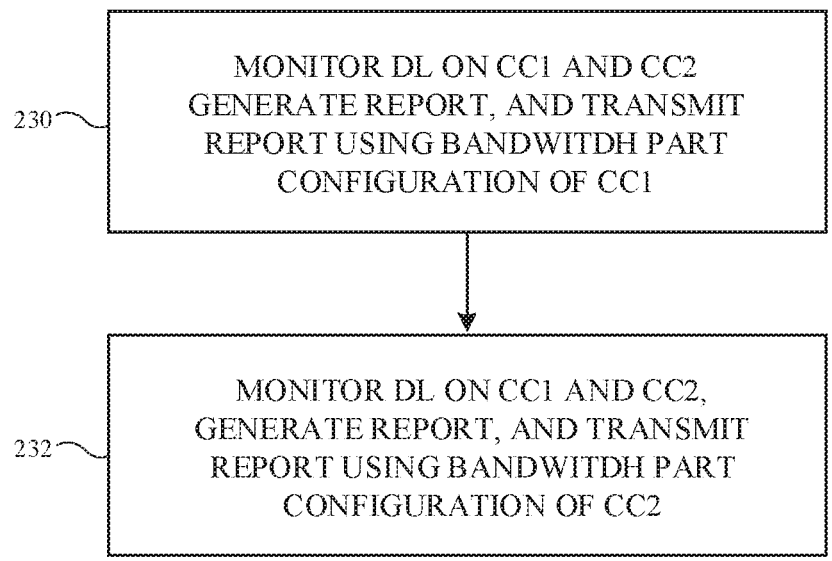
FIG. 19 is a flow chart that may be performed by an electronic device in monitoring downlink data using multiple component carriers and switching between component carriers for performing uplink report transmission in accordance with some embodiments.

FIG. 19 is a flow chart of illustrative steps that may be performed by device 10 in concurrently monitoring downlink signals in both component carriers CC1 and CC2 for generating uplink control channel information. At step 230, control circuitry 14 may monitor downlink signals using both the bandwidth part configuration associated with block 200 of component carrier CC1 and the bandwidth part configuration associated with block 202 of component carrier CC2 (FIG. 17). Control circuitry 14 may generate uplink control channel information (e.g., an uplink report) based on the monitored downlink signals. Wireless circuitry 24 may transmit the generated uplink report using a bandwidth part configuration associated with component carrier CC1, such as the bandwidth part configuration associated with block 204 of FIG. 17. Wireless circuitry 24 may subsequently switch its uplink bandwidth part configuration to a bandwidth part configuration of component carrier CC2.

At step 232, control circuitry 14 may continue to monitor downlink signals using both the bandwidth part configuration associated with block 206 of component carrier CC1 and the bandwidth part configuration associated with block 208 of component carrier CC2 (FIG. 17). Control circuitry 14 may generate uplink control channel information (e.g., an uplink report) based on the monitored downlink signals. Wireless circuitry 24 may transmit the generated uplink report using a bandwidth part configuration associated with component carrier CC2, such as the bandwidth part configuration associated with block 209 of FIG. 17. This process may be repeated to transmit uplink reports using any desired bandwidth part configurations. In one suitable arrangement, the network that manages base station 11 may align the activation of the new uplink bandwidth part with the CC1 and CC2 monitoring and reporting periods. In another suitable arrangement, device 10 may restart appropriate measurements and monitoring/reporting periods after a new uplink bandwidth part activation.

Figure 20:
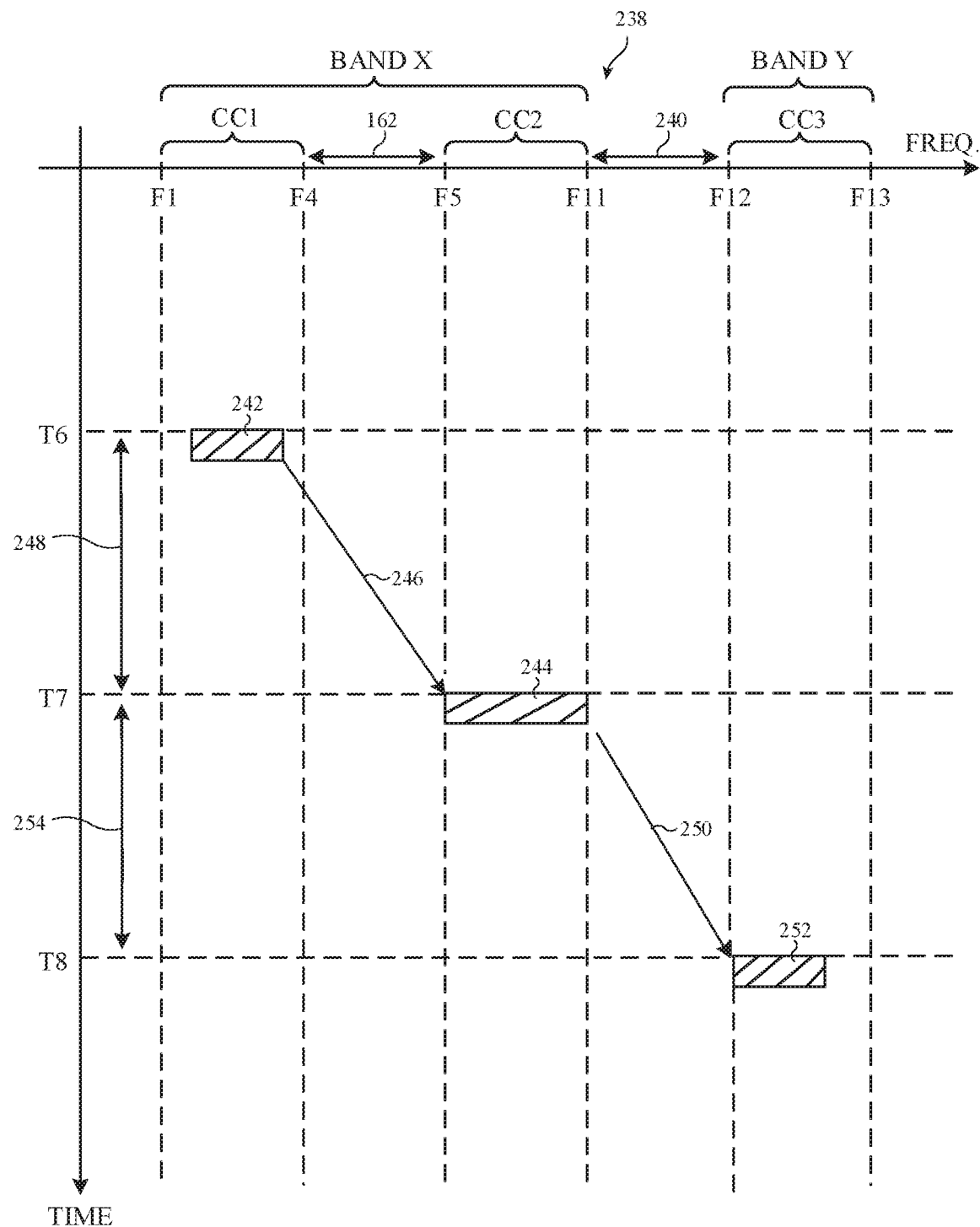
FIG. 20 is an illustrative scheduling diagram associated with switching between three component carriers across two frequency bands for uplink signal transmission in accordance with some embodiments.

If desired, device 10 may switch between three component carriers across two frequency bands for uplink signal transmission. FIG. 20 is a scheduling diagram showing how device 10 may switch between three component carriers across two frequency bands for uplink signal transmission. As shown in FIG. 20, scheduling diagram 238 plots frequency on the horizontal axis and time on the vertical axis.

In this example, component carriers CC1 and CC2 are both within communications band X (e.g., a communications band defined by the 5G NR communications protocol). Component carriers CC1 and CC2 may be non-contiguous intra-band component carriers (e.g., frequency separation 162 may be non-zero) or may be contiguous intra-band component carriers (e.g., frequency separation 162 may be zero). Device 10 and base station 11 may also communicate within communications band Y (e.g., a communications band defined by the 5G NR communications protocol). Communications band Y is separated from communications band X by frequency gap 240. Communications band Y may include a corresponding component carrier CC3. Component carrier CC3 may extend from frequency F12 to frequency F13. Component carrier CC3 may include one or more bandwidth parts. Device 10 may have different states or bandwidth part configurations to handle communications using the different bandwidth parts of component carrier CC3.

Scheduling diagram 238 only illustrates uplink signaling by device 10 for the sake of clarity. However, base station 11 may transmit downlink signals using component carriers CC1, CC2, and/or CC3 at times T6, T7, and T8 of scheduling diagram 238. Wireless circuitry 24 may initially be placed in a state (bandwidth part configuration) that configures the wireless circuitry to transmit uplink signals using a bandwidth part (e.g., an active bandwidth part) of component carrier CC1 (e.g., any of bandwidth parts BWPA, BWPB, or BWPC of FIG. 15).

As shown by block 242, at time T6, device 10 may transmit uplink signals using the active bandwidth part of component carrier CC1. The uplink signals may include uplink control channel information (e.g., an uplink report gathered in response to any combination of the downlink signals received from base station 11) or other uplink traffic (e.g., non-control data traffic). Wireless circuitry 24 may then switch to a bandwidth part configuration of component carrier CC2, as shown by arrow 246 (e.g., bandwidth part(s) of component carrier CC2 may be activated such as bandwidth parts BWPD, BWPE, BWPF, and/or BWPG of FIG. 15).

At time T7, wireless circuitry 24 may transmit uplink signals using the active bandwidth part(s) of component carrier CC2, as shown by block 244. There may be a bandwidth part switching time 248 between the uplink signal transmissions associated with blocks 242 and 244 that allows wireless circuitry 24 sufficient time to switch between the bandwidth part configuration associated with block 242 and the bandwidth part configuration associated with block 244 (e.g., sufficient time to adjust switching circuitry SW of FIG. 5). Wireless circuitry 24 may then switch to a bandwidth part configuration of component carrier CC3 (in band Y), as shown by arrow 250 (e.g., bandwidth part(s) of component carrier CC3 may be activated).

At time T8, wireless circuitry 24 may transmit uplink signals using the active bandwidth part(s) of component carrier CC3, as shown by block 252. There may be a bandwidth part switching time 254 between the uplink signal transmissions associated with blocks 244 and 252 that allows wireless circuitry 24 sufficient time to switch between the bandwidth part configuration associated with block 244 and the bandwidth part configuration associated with block 252 (e.g., sufficient time to adjust switching circuitry SW of FIG. 5).

The example of FIG. 20 is merely illustrative. Device 10 may continue to switch between different bandwidth part configurations of component carriers CC1 and/or CC2 over time (e.g., based on the scheduling scheme provided by base station 11). Device 10 may switch between any desired combinations of bandwidth parts of component carriers CC1, CC2, and CC3. For applicable bands in the band combination, the uplink carrier aggregation scheduler may be restricted such that all uplink resources are restricted to a single component carrier over a certain period.

When activating an uplink bandwidth part in a different component carrier within a different band (e.g., when performing inter-band switching as shown by arrow 250), a restriction on the schedule to accommodate radio-frequency re-tuning time, baseband re-configuration delay, synchronization delay, and system information reading delay may be incorporated into switching time 254. Synchronization and system information reading procedures may be performed prior to the uplink bandwidth part switching operation, thereby optimizing overall delay. When activating an uplink bandwidth part in a different component carrier within the same band (e.g., when performing intra-band switching as shown by arrow 246), a restriction on the schedule to accommodate radio-frequency re-tuning time and baseband re-configuration delay may be incorporated into switching time 254 (e.g., as an optimization of the inter-band switching delay). If desired, RRC signaling on the current component carrier, in preparation for the bandwidth part switching operation, may be included to further optimize the switching time. For example, the network's estimate of difference in timing between the carriers (timing advance) and system information components for the new carrier may be provided.

Figure 21:
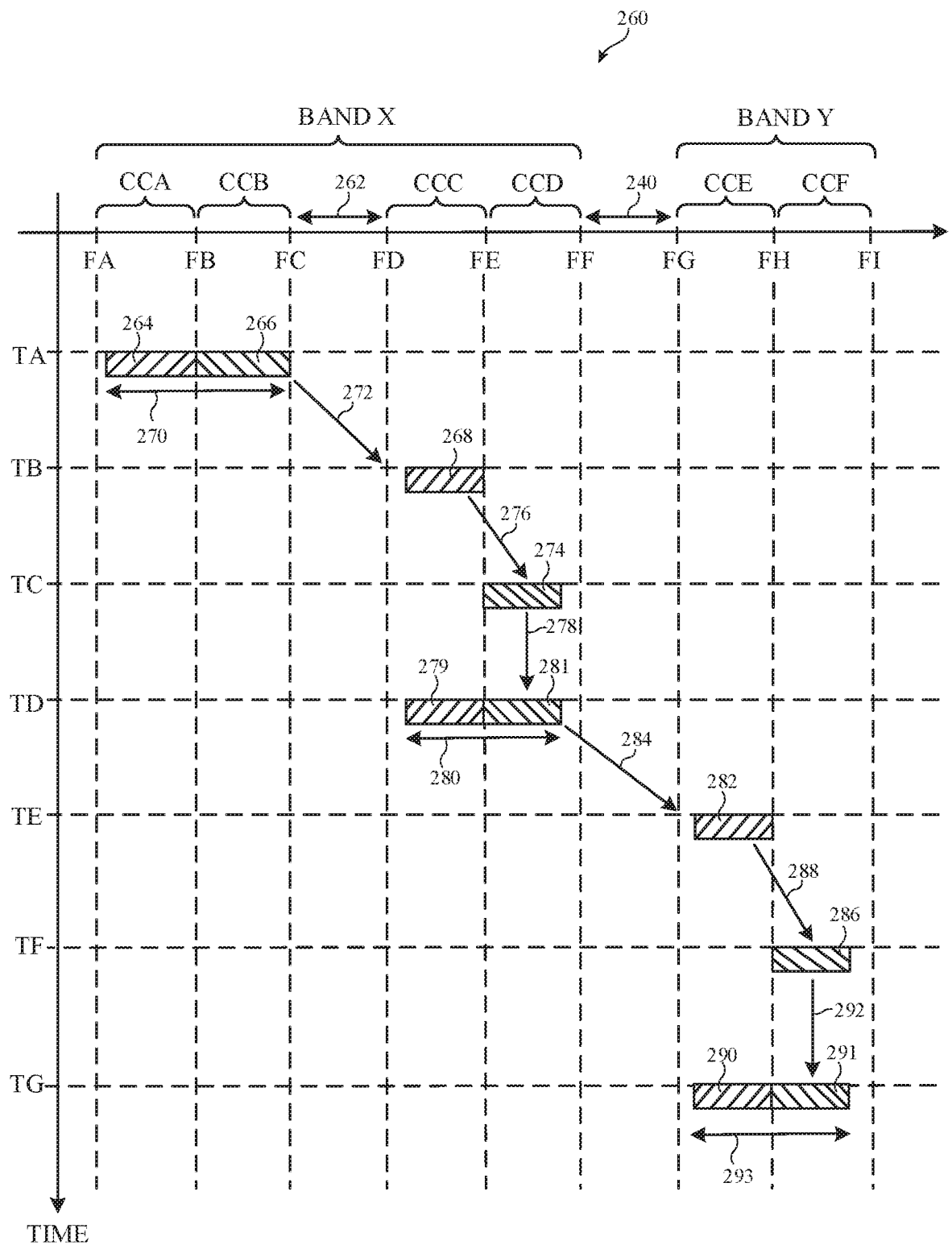
FIG. 21 is an illustrative scheduling diagram associated with switching between different bandwidth part configurations of six component carriers across two frequency bands for uplink signal transmission in accordance with some embodiments.

If desired, device 10 may switch between different bandwidth part configurations of six component carriers distributed across two frequency bands for uplink signal transmission. FIG. 21 is a scheduling diagram showing how device 10 may switch between different bandwidth part configurations of six component carriers distributed across two frequency bands for uplink signal transmission. As shown in FIG. 21, scheduling diagram 260 plots frequency on the horizontal axis and time on the vertical axis.

In this example, band X includes four component carriers CCA, CCB, CCC, and CCD and band Y includes two component carriers CCE and CCF. Component carrier CCA extends from frequency FA to frequency FB, component carrier CCB extends from frequency FB to frequency FC, component carrier CCC extends from frequency FD to frequency FE, and component carrier CCD extends from frequency FE to frequency FF (e.g., band X may extend between frequencies FA and FF such as frequencies F1 and F11 of FIG. 20). Component carriers CCA and CCB are intra-band contiguous component carriers and component carriers CCC and CCD are intra-band contiguous component carriers. Component carrier CCB is separated from component carrier CCB by non-zero frequency gap 262 (e.g., component carriers CCB and CCC are non-contiguous intra-band component carriers). Component carrier CCE extends from frequency FG to frequency FH. Component carrier CCF extends from frequency FH to frequency FI (e.g., component carriers CCE and CCF are contiguous intra-band component carriers).

Component carriers CCA-CCF may each include one or more corresponding bandwidth parts. Device 10 may have different states or bandwidth part configurations to handle communications using the different bandwidth parts of component carriers CCA-CCF. Scheduling diagram 260 only illustrates uplink signaling by device 10 for the sake of clarity. However, base station 11 may transmit downlink signals using any combination of some or all of component carriers CCA-CCF at times TA-TG of scheduling diagram 260. Wireless circuitry 24 may initially be placed in a state (bandwidth part configuration) that configures the wireless circuitry to transmit uplink signals using bandwidth parts in both component carriers CCA and CCB (e.g., device 10 may have active bandwidth parts in intra-band contiguous component carriers of band X).

As shown by block 264, at time TA, device 10 may transmit uplink signals using the active bandwidth part of component carrier CCA. As shown by block 266, at time TA, device 10 may also transmit uplink signals using the active bandwidth part of component carrier CCB. In this way, device 10 may perform uplink carrier aggregation across contiguous intra-band component carriers CCA and CCB. The bandwidths of blocks 264 and 266 may collectively define a contiguous aggregate bandwidth 270 for device 10 (e.g., 800 MHz or other bandwidths). Wireless circuitry 24 may then switch to a bandwidth part configuration of component carrier CCC, as shown by arrow 272 (e.g., bandwidth part(s) of component carrier CCC may be activated).

As shown by block 268, at time TB, device 10 may transmit uplink signals using the active bandwidth part of component carrier CCC. In this way, device 10 may switch between transmitting uplink signals using contiguous intra-band component carriers (e.g., using carrier aggregation) to transmitting uplink signals using a non-contiguous component carrier in the same band (e.g., a non-contiguous intra-band component carrier). Wireless circuitry 24 may then switch to a bandwidth part configuration of component carrier CCD, as shown by arrow 276 (e.g., bandwidth part(s) of component carrier CCD may be activated).

As shown by block 274, at time TC, device 10 may transmit uplink signals using the active bandwidth part of component carrier CCD. In this way, device 10 may switch between transmitting uplink signals using a first component carrier to transmitting uplink signals using a second component carrier that is intra-band and contiguous with respect to the first component carrier. Wireless circuitry 24 may then switch to a state (bandwidth part configuration) that configures the wireless circuitry to transmit uplink signals using bandwidth parts in both component carriers CCC and CCD, as shown by arrow 278 (e.g., device 10 may have active bandwidth pats in intra-band contiguous component carriers of band X).

As shown by block 279, at time TD, device 10 may transmit uplink signals using the active bandwidth part of component carrier CCC. As shown by block 281, at time TD, device 10 may also transmit uplink signals using the active bandwidth part of component carrier CCD. The bandwidths of blocks 279 and 281 may collectively define a contiguous aggregate bandwidth 280 for device 10 (e.g., 800 MHz or other bandwidths). In this way, device 10 may switch between transmitting uplink signals using a first component carrier and transmitting uplink signals using the first component carrier and a second component carrier that is contiguous and intra-band with respect to the first component carrier (e.g., using uplink carrier aggregation). Wireless circuitry 24 may then switch to a bandwidth part configuration of component carrier CCE of band Y, as shown by arrow 284 (e.g., bandwidth part(s) of component carrier CCE may be activated).

As shown by block 282, at time TE, device 10 may transmit uplink signals using the active bandwidth part of component carrier CCE. In this way, device 10 may switch between transmitting uplink signals using contiguous intra-band component carriers (e.g., using carrier aggregation) to transmitting uplink signals using a component carrier in a different band (e.g., using inter-band switching). Wireless circuitry 24 may then switch to a bandwidth part configuration of component carrier CCF, as shown by arrow 288 (e.g., bandwidth part(s) of component carrier CCF may be activated).

As shown by block 286, at time TF, device 10 may transmit uplink signals using the active bandwidth part of component carrier CCF. In this way, device 10 may switch between transmitting uplink signals using a first component carrier to transmitting uplink signals using a second component carrier that is intra-band and contiguous with respect to the first component carrier. Wireless circuitry 24 may then switch to a state (bandwidth part configuration) that configures the wireless circuitry to transmit uplink signals using bandwidth parts in both component carriers CCE and CCF, as shown by arrow 292 (e.g., device 10 may have active bandwidth parts in intra-band contiguous component carriers of band Y).

As shown by block 290, at time TG, device 10 may transmit uplink signals using the active bandwidth part of component carrier CCE. As shown by block 291, at time TG, device 10 may also transmit uplink signals using the active bandwidth part of component carrier CCF. The bandwidths of blocks 290 and 291 may collectively define a contiguous aggregate bandwidth 293 for device 10 (e.g., 800 MHz or other bandwidths). In this way, device 10 may switch between transmitting uplink signals using a first component carrier and transmitting uplink signals using the first component carrier and a second component carrier that is contiguous and intra-band with respect to the first component carrier (e.g., using uplink carrier aggregation).

The example of FIG. 21 is merely illustrative. Device 10 may continue to switch between different bandwidth part configurations of component carriers CCA-CCF over time (e.g., based on the scheduling scheme provided by base station 11). Device 10 may switch between any desired combinations of bandwidth parts of component carriers CCA-CCF (e.g., the switching operations shown in FIG. 21 may be performed in any desired order). Some of these switching steps may be omitted if desired. Appropriate bandwidth part switching times may be incorporated into scheduling diagram 260. The group of bandwidth parts that are active in wireless circuitry 24 at any given time may sometimes be referred to herein as a set of active bandwidth parts or a combination of active bandwidth parts, which may be distributed across multiple contiguous or non-contiguous component carriers in the same band and/or different bands.

Device 10 (e.g., control circuitry 14 and wireless circuitry 24) and/or base station 11 may be configured to perform the operations of FIGS. 6-21 using hardware (e.g., dedicated hardware or circuitry), firmware, and/or software. Software code for performing the operations of FIGS. 6-21 may, for example, be stored on storage circuitry 20 (e.g., storage circuitry 20 may include non-transitory (tangible) computer readable storage media that stores the software code). The software code may sometimes be referred to as program instructions, software, data, instructions, or code. Software code stored on storage circuitry 20 may be executed by processing circuitry 22.

The foregoing is merely illustrative and various modifications can be made by those skilled in the art without departing from the scope and spirit of the described embodiments. The foregoing embodiments may be implemented individually or in any combination.

What is claimed is:

1. A method of operating an electronic device having control circuitry and wireless circuitry, the method comprising:
   with the control circuitry, placing the wireless circuitry in a first bandwidth part configuration in which a first bandwidth part of a first component carrier is active and in which a second bandwidth part of a second component carrier that is different from the first component carrier is inactive;
   with the wireless circuitry, while in the first bandwidth part configuration, transmitting first uplink signals using the first bandwidth part of the first component carrier;
   with the control circuitry, switching the wireless circuitry from the first bandwidth part configuration to a second bandwidth part configuration in which each bandwidth part of the first component carrier is inactive and in which the second bandwidth part of the second component carrier is active; and
   with the wireless circuitry, while in the second bandwidth part configuration, transmitting second uplink signals using the second bandwidth part of the second component carrier.

2. The method of claim 1, wherein the first and second component carriers comprise frequencies greater than 24 GHz.

3. The method of claim 2, wherein the first and second component carriers are intra-band contiguous component carriers.

4. The method of claim 2, wherein the first and second component carriers are intra-band non-contiguous component carriers.

5. The method of claim 4, wherein the first component carrier is in a first communications band of a 5G New Radio (NR) communications protocol and wherein the second component carrier is in a second communications band of the 5G NR communications protocol, the second communications band being different from the first communications band.

6. The method of claim 1, further comprising:
   with the control circuitry, delaying transmission of the second uplink signals until a bandwidth part switching time has elapsed; and
   with the control circuitry, retuning an antenna of the wireless circuitry during the bandwidth part switching time.

7. The method of claim 1, further comprising:
   with the control circuitry, switching the wireless circuitry from the second bandwidth part configuration to a third bandwidth part configuration in which the first bandwidth part of the first component carrier is inactive, in which the second bandwidth part of the second component carrier is inactive, and in which third and fourth bandwidth parts of the second component carrier are active; and
   with the wireless circuitry, while in the third bandwidth part configuration, transmitting third uplink signals using the third and fourth bandwidth parts of the second component carrier.

8. The method of claim 1, further comprising:
   with the wireless circuitry, receiving downlink signals using the first component carrier;
   with the control circuitry, generating first uplink control channel information based on the downlink signals received using the first component carrier; and
   with the wireless circuitry, while in the first bandwidth part configuration, transmitting the first uplink control channel information using the first uplink signals.

9. The method of claim 8, further comprising:
   with the control circuitry, after transmission of the first uplink control channel information, generating second uplink control channel information based on the downlink signals received using the first component carrier; and
   with the wireless circuitry, while in the second bandwidth part configuration, transmitting the second uplink control channel information using the second uplink signals.

10. The method of claim 9, further comprising:
    with the wireless circuitry, after transmission of the second uplink control channel information, receiving additional downlink signals using the second component carrier;
    with the control circuitry, generating third uplink control channel information based on the additional downlink signals received using the second component carrier; and
    with the wireless circuitry, while in the second bandwidth part configuration, transmitting the third uplink control channel information using the second uplink signals.

11. The method of claim 8, wherein the first uplink control channel information comprises information selected from the group consisting of: a radio resource management (RRM) report and a physical layer report.

12. The method of claim 1, further comprising:
with the wireless circuitry, concurrently receiving downlink signals using the first and second component carriers;
with the control circuitry, generating first uplink control channel information based on the downlink signals received using the first and second component carriers;
with the wireless circuitry, while in the first bandwidth part configuration, transmitting the first uplink control channel information using the first uplink signals;
with the control circuitry, after transmission of the first uplink control channel information, generating second uplink control information based on the downlink signals received using the first and second component carriers; and
with the control circuitry, while in the second bandwidth part configuration, transmitting the second uplink control channel information using the second uplink signals.

13. The method of claim 1, further comprising:
with the control circuitry, switching the wireless circuitry from the second bandwidth part configuration to a third bandwidth part configuration in which the first bandwidth part of the first component carrier is inactive, in which the second bandwidth part of the second component carrier is inactive, and in which a third bandwidth part of a third component carrier is active, wherein the first and second component carriers are in a first communications band and wherein the third component carrier is in a second communications band that is different from the first communications band; and
with the wireless circuitry, while in the third bandwidth part configuration, transmitting third uplink signals using the third bandwidth part of the third component carrier.

14. The method of claim 13, wherein the first and second communications bands comprise frequencies greater than 24 GHz and wherein the first component carrier is separated from the second component carrier by a non-zero frequency gap.

15. The method of claim 13, wherein the first and second communications bands comprise frequencies greater than 24 GHz and wherein the first component carrier is contiguous with the second component carrier in the first communications band.

16. A method of operating an electronic device having control circuitry and wireless circuitry, the method comprising:
with the control circuitry, placing the wireless circuitry in a first bandwidth part configuration in which a first bandwidth part of a first component carrier is active, a second bandwidth part of a second component carrier is active, and a third bandwidth part of a third component carrier is inactive, wherein the second component carrier is higher in frequency than the first component carrier, the third component carrier is higher in frequency than the second component carrier, the first and second component carriers are in a frequency band of a communications protocol, the frequency band comprises frequencies greater than 24 GHz, and the third component carrier is separated from the second component carrier by a frequency gap;
with the wireless circuitry, while in the first bandwidth part configuration, concurrently transmitting first uplink signals using the first bandwidth part of the first component carrier and the second bandwidth part of the second component carrier;
with the control circuitry, switching the wireless circuitry from the first bandwidth part configuration to a second bandwidth part configuration in which the first bandwidth part of the first component carrier is inactive, the second bandwidth part of the second component carrier is inactive, and the third bandwidth part of the third component carrier is active; and
with the wireless circuitry, while in the second bandwidth part configuration, transmitting second uplink signals using the third bandwidth part of the third component carrier.

17. The method of claim 16, wherein the third component carrier is in the frequency band and the frequency gap is non-zero.

18. The method of claim 16, wherein the third component carrier is in an additional frequency band of the communications protocol, the communications protocol comprises a 5G New Radio (NR) communications protocol, and the additional frequency band is different from the frequency band that includes the first and second component carriers.

19. A method of operating an electronic device having control circuitry and wireless circuitry to communicate with a wireless base station, the method comprising:
with the wireless circuitry, receiving first downlink signals using a first component carrier, wherein the first component carrier includes a first frequency within a Frequency Range 2 (FR2) frequency range of a 5G New Radio (NR) communications protocol;
with the control circuitry, during a configurable monitoring period having an adjustable duration that is set by the wireless base station, generating uplink control channel information based on the first downlink signals received using the first component carrier;
with the wireless circuitry, during the configurable monitoring period, transmitting the uplink control channel information using a second component carrier, wherein the second component carrier includes a second frequency within a Frequency Range 1 (FR1) frequency range of the 5G NR communications protocol; and
with the wireless circuitry, after the configurable monitoring period has elapsed, receiving second downlink signals using the first component carrier.

20. The method of claim 19, wherein the uplink control channel information comprises hybrid automatic repeat request (HARQ) feedback.

* * * * *